United States Patent
Watanabe et al.

(10) Patent No.: US 9,384,380 B2
(45) Date of Patent: Jul. 5, 2016

(54) INFORMATION RECORDING MEDIA, INFORMATION REPRODUCTION APPARATUS, AND INFORMATION REPRODUCING METHOD

(71) Applicant: Hitachi Media Electronics Co., Ltd., Kanagawa (JP)

(72) Inventors: Takao Watanabe, Tokyo (JP); Daisuke Tomita, Yokohama (JP); Koichi Watanabe, Tokyo (JP); Ryo Imai, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 22 days.

(21) Appl. No.: 14/191,949

(22) Filed: Feb. 27, 2014

(65) Prior Publication Data
US 2015/0034723 A1 Feb. 5, 2015

(30) Foreign Application Priority Data

Aug. 2, 2013 (JP) .................. 2013-160951

(51) Int. Cl.
G06K 19/00 (2006.01)
G06K 7/14 (2006.01)
G11B 7/0045 (2006.01)
G11B 7/005 (2006.01)
G11B 7/007 (2006.01)

(52) U.S. Cl.
CPC ............ *G06K 7/1491* (2013.01); *G11B 7/0051* (2013.01); *G11B 7/00455* (2013.01); *G11B 7/00736* (2013.01)

(58) Field of Classification Search
USPC .................. 235/435, 439, 454, 462
See application file for complete search history.

(56) References Cited

U.S. PATENT DOCUMENTS

| | | | |
|---|---|---|---|
| 5,694,249 A * | 12/1997 | Misawa | 359/620 |
| 5,761,111 A | 6/1998 | Glezer | |
| 6,158,905 A * | 12/2000 | Endo | 400/76 |
| 2010/0147947 A1* | 6/2010 | Aker | G06K 7/10722 235/454 |
| 2010/0215216 A1* | 8/2010 | Hong et al. | 382/103 |

FOREIGN PATENT DOCUMENTS

JP 8-220688 A 8/1996

OTHER PUBLICATIONS

E. N. Glezer et al., Three-dimensional optical storage inside transparent materials, Optics Letters, Dec. 15, 1996, pp. 2023-2025, vol. 21, No. 24.
Manabu Shiozawa et al., Simultaneous Multi-Bit Recording in Fused Silica for Permanent Storate, Mo-D-01.
(Continued)

*Primary Examiner* — Matthew Mikels
(74) *Attorney, Agent, or Firm* — Baker Botts L.L.P.

(57) ABSTRACT

A motion picture is captured while a focal position is changed in a predetermined reproduction layer of a recording medium, the resolutions of a plurality of still images acquired by the capturing of the motion picture are checked using check patterns, which are recorded at a predetermined frequency, of the medium, it is determined whether the still images are usable for the reproduction of data, and a plurality of the still images determined to be usable are composed.

18 Claims, 24 Drawing Sheets

(56) References Cited

OTHER PUBLICATIONS

Takao Watanabe et al., Driveless Read System for Permanent Storage in Synthetic Fused Silica, MO-D-02.

Masaaki Sakakura et al, Improved phase hologram design for generating symmetric light spot and its application for laser writing of waveguide, Optics Letters, Apr. 1, 2011, pp. 1065-1067, vol. 36, No. 7.

* cited by examiner

INFORMATION RECORDING MEDIA, INFORMATION REPRODUCTION APPARATUS, AND INFORMATION REPRODUCING METHOD

CROSS-REFERENCE TO RELATED APPLICATIONS

This application claims the Japanese Patent Application No. 2013-160951, filed on Aug. 2, 2013, which is incorporated herein by reference in its entirety.

BACKGROUND OF THE INVENTION

1. Field of the Invention

The present invention relates to an information recording medium, a reproduction apparatus reproducing information recorded on the medium, and a reproduction method.

2. Description of the Related Art

It has been known that minute structural changed areas having optical characteristics such as a refractive index to be different from those of the periphery thereof are formed when focusing short laser pulses inside a transparent medium such as fused silica, colorless crystal, or transparent ceramics. It is considered to three-dimensionally form a plurality of such minute structural changed areas inside a medium and to use the formed minute structural changed areas for recording information.

In JP-8-220688-A, U.S. Pat. No. 576,111, E. N. Glezer, et al., "Three-dimensional optical storage in side transparent materials", Opt. Lett., Vol. 21, No. 24, pp. 2023-2025 (1996), Manabu Shiozawa et al., ISOM2012, Mo-D-01, Tokyo (2012), and Takao Watanabe et al., ISOM2012, Mo-D-02, Tokyo (2012), it has been disclosed to record data inside of a material, which is stable to be uniform, such as glass. Such a recording medium has an advantage of having superior durability and is suitable particularly for long-term storage of data. A mechanism for forming a local modification according to short laser pulses, for example, is described in M. Sakakura, et al., "Improved phase hologram design for generating symmetric light spots and its application for laser writing of waveguides", Opt. Lett., Vol. 36, No. 7, pp. 1065-1067 (2011).

In addition, in Takao Watanabe et al., ISOM2012, Mo-D-02, Tokyo (2012), a reproduction method for using a photograph captured by using a camera attached to a microscope of about 20 magnifications has been disclosed. A result of the reproduction of digital data which is recorded in four layers by performing signal processing for improving the contrast of minute structural changed areas of the photograph with an error rate of a $10^{-3}$ base has been reported. In such a method, since the reproduction is performed using an image, unlike a general optical disc, high-speed rotation and precise tracking are not necessary. Accordingly, there are advantages of easily reproducing a read system even after the elapse of a long time and being capable of reading the data.

However, in the method disclosed in Takao Watanabe et al., ISOM2012, Mo-D-02, Tokyo (2012), since the microscope is used, the reproduction can be performed in a case where a technical expert operates in a laboratory having a vibration-proof function. However, it is difficult for a general user to perform the reproduction in a normal residential space. In order for a general user to perform the reproduction in a normal residential space, it is necessary to facilitate a composition rule, focusing, photographing timing, and the like. Conventionally, a review from this viewpoint has not been made. Accordingly, there has been no read system in which handling for reproducing minute structural changed areas included in a transparent medium as digital bit information is simple.

Meanwhile, currently, while a two-dimensional bar code that is generally distributed is one recording form of digital data having an error correction function, commonly, it is printed to have a relatively large size (a degree to which a black/white shape corresponding to one bit is visible) with high contrast on a sheet. Accordingly, the code can be reproduced by only holding a camera attached to a cellular phone or the like using the hand and photographing the sheet on which the code has been printed.

However, it is difficult to simply reproduce a two-dimensional bar code that is recoded as minute regions having low contrast in a transparent medium as described above or general digital data by using a camera that is attached to a cellular phone or the like.

SUMMARY OF THE INVENTION

The present invention provides a medium used for reproducing minute structural changed areas having low contrast formed in a transparent medium in a simple manner and a reproduction apparatus and a reproduction method capable of performing reproduction with high reliability in a simple manner.

(1) First, a representative overview of the recording medium is as follows.

In a recording medium, in which a plurality of minute structural changed areas are formed inside in the shape of a layer, that is transparent for reproduction light, the minute structural changed areas (hereinafter, referred to as dots) are formed in the shape of one or a plurality of planar layers, and data is recorded in accordance with the arrangement of the dots. In addition, in each layer, check patterns each configured by a plurality of dots are arranged, and each check pattern is configured by a plurality of portions having mutually-different spatial frequencies of the dot arrangements.

In addition, the check patterns are arranged at an interval for which, when each layer is captured at a magnification required for the reproduction of the data, at least one check pattern is included in the composition.

(2) In addition, regarding an information reproduction apparatus and an information reproducing method for reproducing recorded data from a recording medium, there are provided an information reproduction apparatus including: a capturing unit that captures a motion picture while changing a focal position in a predetermined reproduction layer of the recording medium; a unit that checks the resolutions of a plurality of still images (hereinafter, referred to as frames) acquired by the capturing of the motion picture using the check patterns and determines whether the still images are usable for the reproduction of the data; and a unit that composes a plurality of the still images determined to be usable and an information reproducing method using the information reproduction apparatus.

According to the configuration described above, frames in which data portions are captured with sufficient resolutions are selected based on the image qualities of the check patterns, and an image is acquired by composing the selected necessary frames, whereby recorded data can be simply reproduced with high reliability.

DESCRIPTION OF THE PREFERRED EMBODIMENTS

Hereinafter, embodiments of the present invention will be described in detail with reference to the drawings.

Example 1

Figure 1:
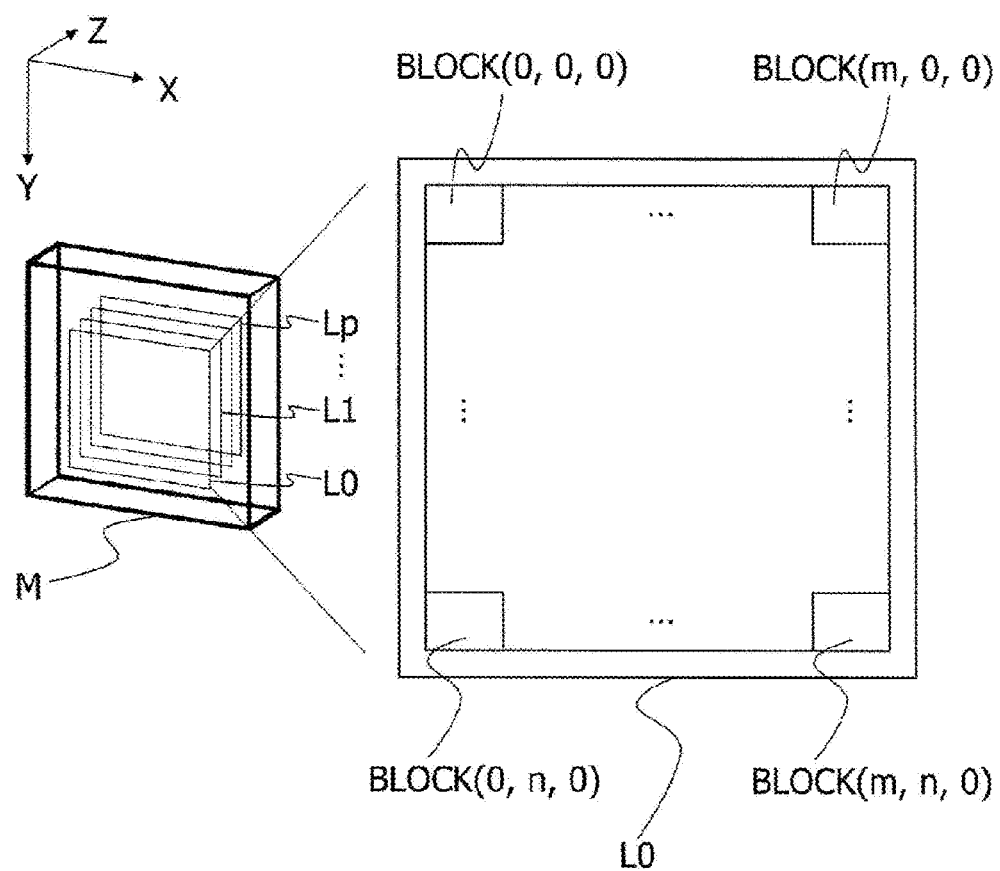
FIG. 1 is a first example that illustrates the arrangement of data blocks in a transparent recording medium.

FIG. 1 is a first example that illustrates the physical arrangement of data recorded on a transparent recording medium in the present invention. In this example, a recording medium M is a plate-shaped transparent medium, and the material thereof is glass such as fused silica, plastic, alumina, or transparent ceramics. For the convenience of description, as illustrated in the figure, it is assumed that the direction Z is the thickness direction of the medium, and the directions X and Y represent planar orthogonal coordinates perpendicular thereto.

As illustrated in FIG. 1, layers L0, and L1 to Lp in which a plurality of minute structural changed areas (dots) (not illustrated in the figure) are discretely formed are formed at mutually-different Z coordinates inside the recording medium M. The number of layers is a total of (p+1). Here, p is an integer that is equal to zero or more. In order to illustrate the structure of each layer, the structure of the layer L0 is illustrated in the figure. Inside the layer, data is recorded with being subdivided into rectangular areas called as data blocks BLOCK. The data block, as will be described later, is a set of dots. Hereinafter, for easy understanding of the description, a name to which indices representing a three dimensional position is attached is assigned to each data block BLOCK. In the layer L0 illustrated in the figure, an upper left data block is BLOCK(0, 0, 0), an upper right data block is BLOCK(m, 0, 0), a lower left block is BLOCK(0, n, 0), and a lower right block is BLOCK (m, n, 0). Among the indices represented in a parentheses included in the name of a data block, the first index represents a position in the direction X, the second index represents a position in the direction Y, and the final index represents a position (layer number) in the direction Z. In other words, inside a same layer, a total of (m+1) data blocks disposed in the direction X and a total of (n+1) data blocks disposed in the direction Y are aligned vertically and horizontally. Here, while only the layer L0 is illustrated, the other layers have the same structure. Thus, for example, the name of a data block of the layer Lp positioned at the XY position that is the same as that of the data block BLOCK(0, 0, 0) of the layer L0 is BLOCK(0, 0, p).

As in this example, when data blocks, which are sets of dots, are subdivided and aligned vertically and horizontally with the same pitch in each layer, in a case where the reproduction of data is performed from an image, an approximate position of an individual data block can be easily acquired. Accordingly, detection of a data block portion of an image on which a plurality of blocks are shown up or deriving of coordinates in a case where field of view of a camera need to be scanned in the directions X and Y can be performed at high speed. Particularly, in the scanning of data blocks in the direction Z, by only capturing data blocks while changing the focus of the camera, data blocks having the same indices of X and Y coordinates can be captured at the same place of a field of view, and accordingly, the process for reproduction of data can be easily performed.

In the above-described example, although the example has been illustrated in which a plurality of data blocks are present in one layer, the plurality of data blocks do not need to be necessarily arranged, but a single data block may be disposed in one layer. In such a case, one data block may be recorded using a wide XY area of a medium or may be recorded in a small area.

Example 2

Figure 2:
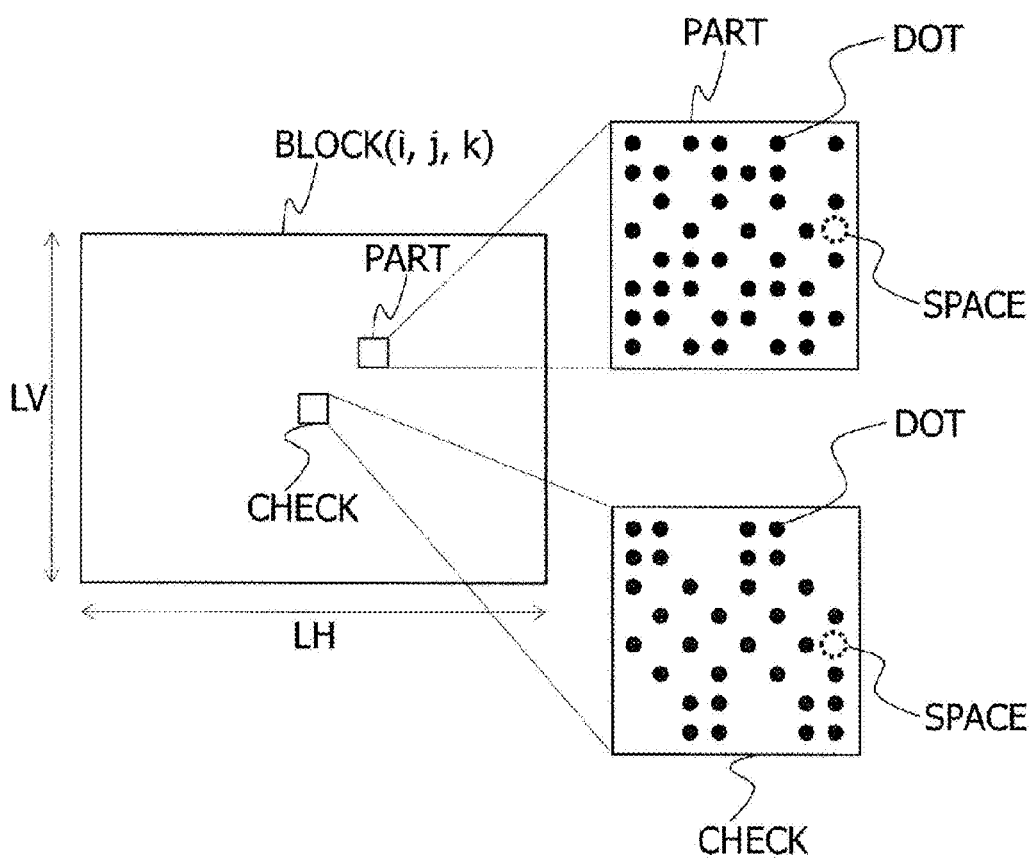
FIG. 2 is an example of a data block having a check pattern at the center.

FIG. 2 is an example that illustrates the arrangement of dots inside a data block. It is assumed that the dimensions of the data block BLOCK(i, j, k) illustrated in the figure in the directions X and Y are respectively LH and LV. Near the center of the data block, there is a check pattern CHECK that is used for checking the quality of an image at the time of reproduction. The periphery of the check pattern is a data area. In the figure, PART is a part of the data area.

On the right side of the figure, the arrangements of dots inside the check pattern CHECK and the PART that is a part of the data area are illustrated. Black points are dots, and the dots are aligned in a lattice shape. Portions in which a dot is missing will be referred to as spaces. A portion in which a dot is present is bit "1", and the space portion is bit "0". Although a portion to be analyzed as "1" is arbitrary, here, the portions are defined as described above. The check pattern CHECK is used for determining whether or not an image of a corresponding data block is captured to have sufficient quality in a case where the reproduction of data from an image captured by a camera is performed. In addition, in a case where capturing is performed by scanning while a field of view is moved, the check pattern may be used for detecting a positional deviation of the field of view during scanning and correcting the coordinates. Furthermore, in order to sample the density of pixels from an image to be binarized and converted into digital data, setting of a threshold used for determining "1" or "0" is necessary, and the arrangement of dots of the check pattern is known, whereby the check pattern may be used also for determining the threshold.

The check pattern of this example is configured by a dot area of 8×8. The dot area of 8×8 is an area in which 8 dots or spaces can be aligned vertically and horizontally. As illustrated in the figure, in the first row to the second row, dots of 2×2 or spaces of 2×2 are aligned in the direction X. In addition, in the third row to the sixth row, one dot and one space are alternately aligned. Furthermore, in the seventh row to the eighth row, dots of 2×2 or spaces of 2×2 are aligned in the direction X. The check pattern has a strong point of being configured by a plurality of areas having mutually different spatial frequencies of the arrangement of dots. In a case where the resolution of such a check pattern portion of an image acquired by capturing a data block is checked, when the third to sixth rows in which data is recorded at a highest spatial frequency are resolved, it can be determined that there is no problem in using the image of the data block including the check pattern for the reproduction of data. On the other hand, even in a case where individual dots are not resolved, when the first to second rows or the seventh to eighth rows are resolved as dots or spaces of the 2×2 size, it can be determined that the focus is slightly deviated. In addition, as will be described later, such an image can be used for the reproduction. By including a low spatial frequency component in the check pattern, there is also an advantage of easily recognizing the position of the check pattern in the data block. In addition, here, while up to a second harmonic component configured by dots or spaces of 2×2 is used, variations such as inclusion of a pattern aligned at a further low frequency or inclusion of a pattern aligned in the row direction can be made. In the former case, there is an advantage of capable of detecting the position of the check pattern even in a case where the focus is considerably deviated. In the latter case, in addition to the resolution in the direction X, the resolution in the direction y can be checked, and accordingly, the check pattern can be effectively used for detecting and correcting an abnormality such as an inclination of the medium with respect to the optical axis.

While a specific method will be described later, according to the example represented in FIG. 2, by using the check pattern, data recorded as minute structural changed areas in the transparent medium can be reproduced from information captured as a motion picture in a simple manner and with high reliability.

Example 3

Figure 3:
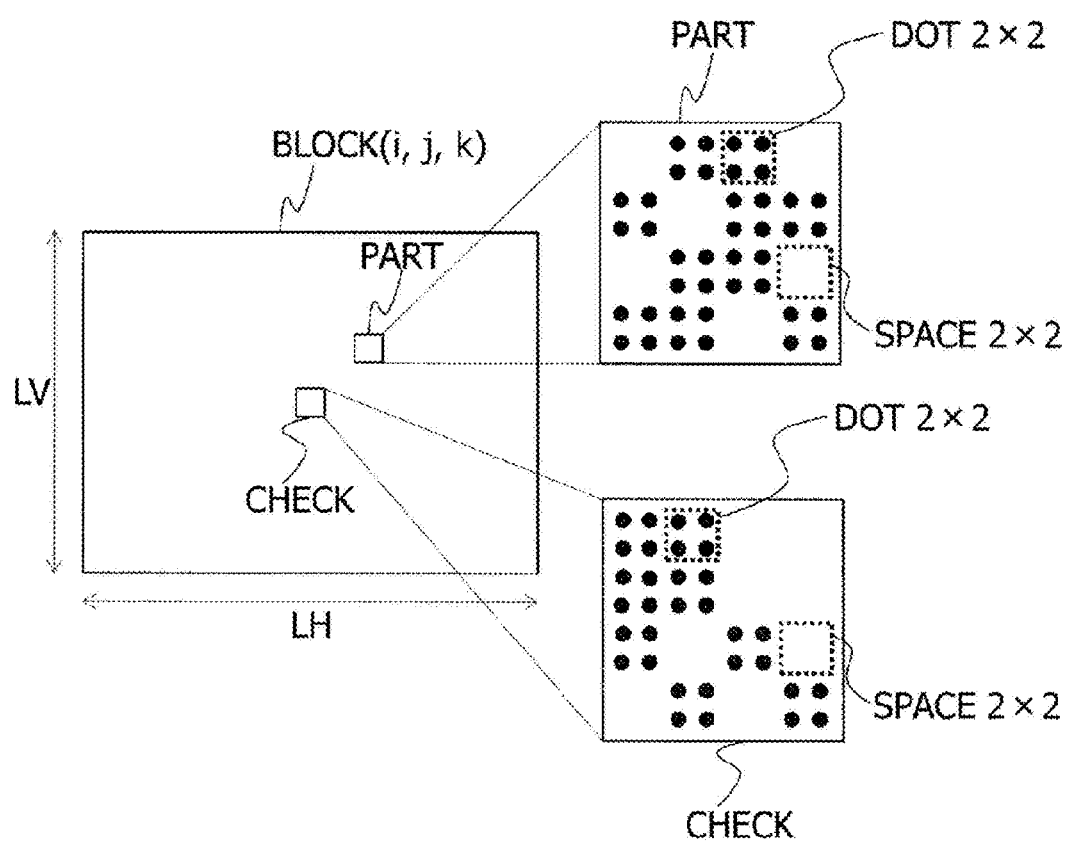
FIG. 3 is an example of a data block having an appropriate check pattern in a case where a set of a plurality of dots corresponds to one bit.

FIG. 3 is an example of a data area in which two dots formed respectively in the vertical direction and the horizontal direction or a space portion having the same area in which there is no dot corresponds to one bit. In the figure, a portion represented by DOT 2×2 is bit "1" configured by 2×2 dots, and a portion represented by SPACE 2×2 corresponds to bit "0". As illustrated in the figure, a check pattern is a set of 4×3 dots or spaces from the first row to the fourth row and is a set of dots or spaces of 2×2 from the fifth row to the eighth row. In other words, in the data portion of this example, the latter is a pattern of a highest spatial frequency, and the former is a pattern of the second harmonic component. This example is suitable for a case where the resolving power of the read system is low. For example, even in a case where a minimal processing pitch of dots is 2 μm, according to this example, when the resolving power of the read system is 4 μm, the presence of bit "0" interposed between bits "1" can be detected without being missed. In short-pulse processing using a femtosecond laser beam or the like, frequently, since it is difficult to freely control the radius of a dot, by configuring a bit using a plurality of dots as in this example, the radius of the dot is artificially viewed to be large, whereby the reduction in the contrast can be effectively prevented. Here, while an example is represented in which one bit is represented by 2×2 dots, it is apparent that one bit may be represented by dots corresponding to an optimal number n×m (here, n and m are integers) according to conditions such as the processing pitch, the radius of the dot, the resolving power of the optical system of the read system, and MTF. In the examples of the check pattern described below, one dot or space will be described to be in correspondence with a bit. Such examples can be easily expanded to an example in which a plurality of dots or spaces correspond to a bit as in FIG. 3, and thus the description thereof will not be presented.

FIG. 2 is the example in which the check pattern is arranged at the center of the data block. Accordingly, in a case where there is no big difference between the image quality of the center portion of the data block and the image quality of the peripheral portion of the data block, the resolution of the check pattern arranged in the center portion can be regarded as being maintained also on the four corners of the data block, whereby the checking of the resolution from the checking pattern is effective. However, depending on the size of the data block, the optical magnification of the optical system performing capturing, and the size of the image sensor, there is also a case where only one data block fits into the same field of view. Generally, there are many cases where the image quality of the four corners of an image is lower than that of the center portion of the image due to the aberration of the optical system or the like. In such a case, for example, the check pattern may be arranged in the peripheral portion of the data block, for example, four corners instead of the center portion of the data block.

Example 4

Figure 4:
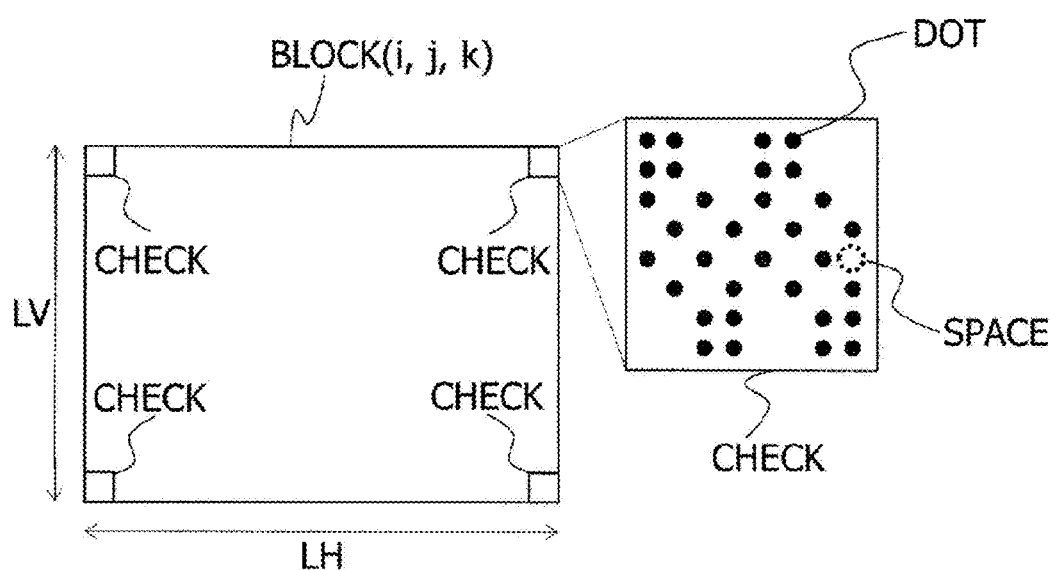
FIG. 4 is an example of a data block having check patterns on four corners.

FIG. 4 is an example in which check patterns are arranged on the four corners of a data block BLOCK(i, j, k). In this example, the resolution of the check patterns on the four corners is checked, the resolution on the four corners of the field of view is checked, and, in a case where the resolutions have allowable values, the resolution of the center portion is regarded to arrive at an allowable level. Accordingly, this example is particularly suitable for a case where only one data block fits into the same field of view.

Example 5

Figure 5:
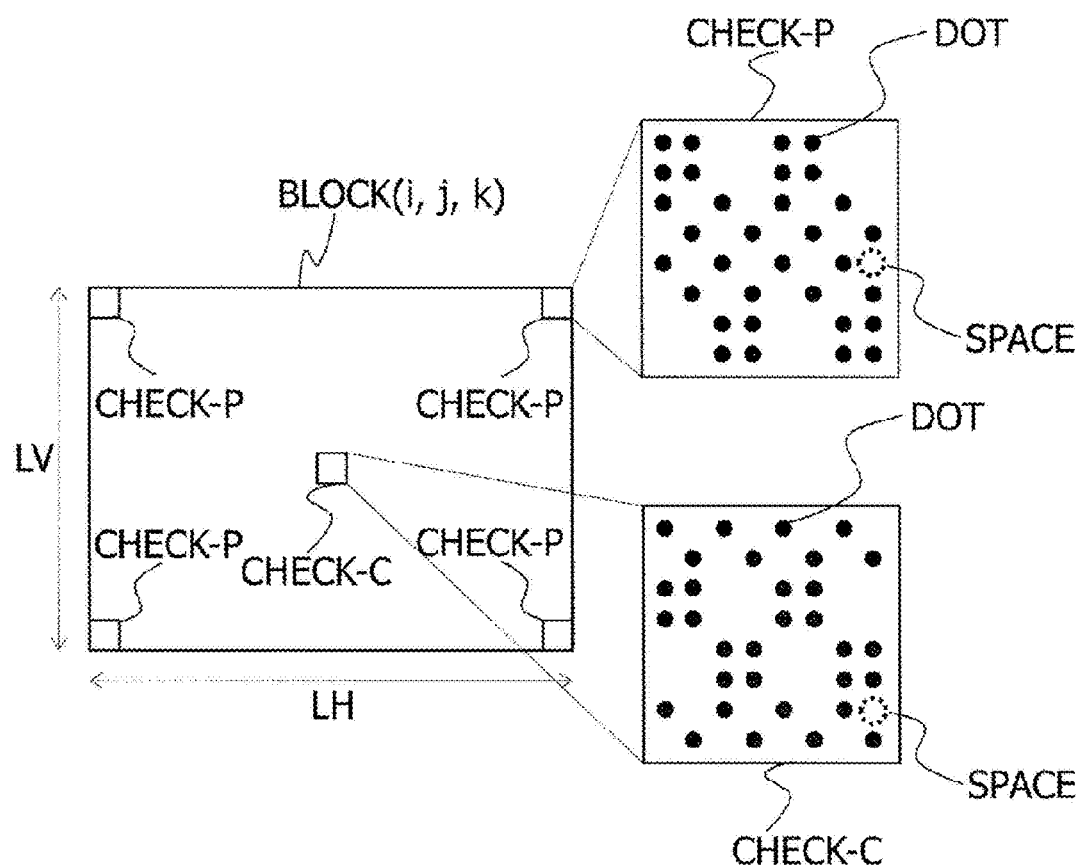
FIG. 5 is an example of a data block that has check patterns at the center and on four corners.

In an example illustrated in FIG. 5, check patterns are arranged not only at the center of a data block but also on the four corners, whereby the resolution can be checked more reliably. As illustrated in the figure, a check pattern CHECK-C is arranged in the center portion, and check patterns CHECK-P are arranged on the four corners. Depending on the optical system, there are cases where in-focus positions are different from each other between the periphery of the field of view and the center portion thereof due to the field curvature. In a case where only one data block fits in the same field of view, when there is the field curvature as described above, it is necessary to place independent check patterns at the center of the data block and in the peripheral portion, capture the check patterns at in-focus positions at which the resolution is allowable therein, and compose a plurality of images. In this example, since the check patterns are arranged in the center portion of the data block and on the periphery thereof, the example is particularly effective in such a case. In addition, as is illustrated in the figure, places of portions having a different spatial frequency are different between the check patterns CHECK-C and CHECK-P. In the check pattern CHECK-C, patterns having a highest spatial frequency are arranged in the first, second, seventh, and eighth rows, and, in the check pattern CHECK-P, patterns having a highest spatial frequency are arranged in the third, fourth, fifth, and sixth rows. As above, by configuring the arrangements of dots to be different from each other in the check patterns in the center portion and the peripheral portion, the check patterns can be discriminated from each other, and accordingly, by adjusting the XY position such that the check pattern arranged in the center portion is positioned at the center of the field of view, the composition can be adjusted in an easy manner. In the figure, although all the check patterns arranged on the four corners are illustrated to be the same, for example, by configuring the upper left check pattern, the lower right check pattern, and the like to be a pattern acquired by being rotated by 90 degrees, the front and the rear sides of the medium can be easily checked, whereby the resolution in the direction Y can be checked as well. Such a scheme may be similarly applied to the above-described examples.

While a method of composing a plurality of images described above will be described again with reference to FIGS. 24A and 24B, for example, there are a method in which a plurality of images having changed focuses are averaged with the XY positions matching each other and a method in which the values of pixels having the same XY coordinates are compared with each other, and the value of the pixel having a darkest density is selected as a representative value. In other words, in a case where a dot is shown up to be darker than a space, since an image is seen to be the darkest when the image is in-focus, the density of a pixel at the position of the dot can be set to a sufficiently dark value in both the center portion of the image and the peripheral portion thereof through the above-described composition. While there is a possibility that the value of the pixel of a space portion is darkened to a certain extent when the radius of a blurred image is large in a case where the dot is defocused, even in a case where a darkest value is selected, the image is the blurred image, and accordingly, a decrease in the value of the pixel is small. In addition, as described in E. N. Glezer, et al., "Three-dimensional optical storage in side transparent materials", Opt. Lett., Vol. 21, No. 24, pp. 2023-2025 (1996), a dot is seen to be brighter or darker than a space portion in accordance with the focal position. Thus, in a case where an image seen to be bright is desired to be acquired, a brightest value may be selected as the representative value at the time of the composition of images.

Until now, the examples in which the unique check patterns are included in individual data blocks have been described with reference to FIGS. 2 to 5. In order to effectively use the area of the data block for recording data, it is preferable that the area penalty according to the check patterns should be configured to be as small as can be. In a case where the area penalty is small, the amount of data recordable in the same area is large. In other words, the size of the medium used for recording the same data volume decreases, whereby reduction in the cost of the medium or reduction in the housing area can be expected.

Example 6

Figure 6:
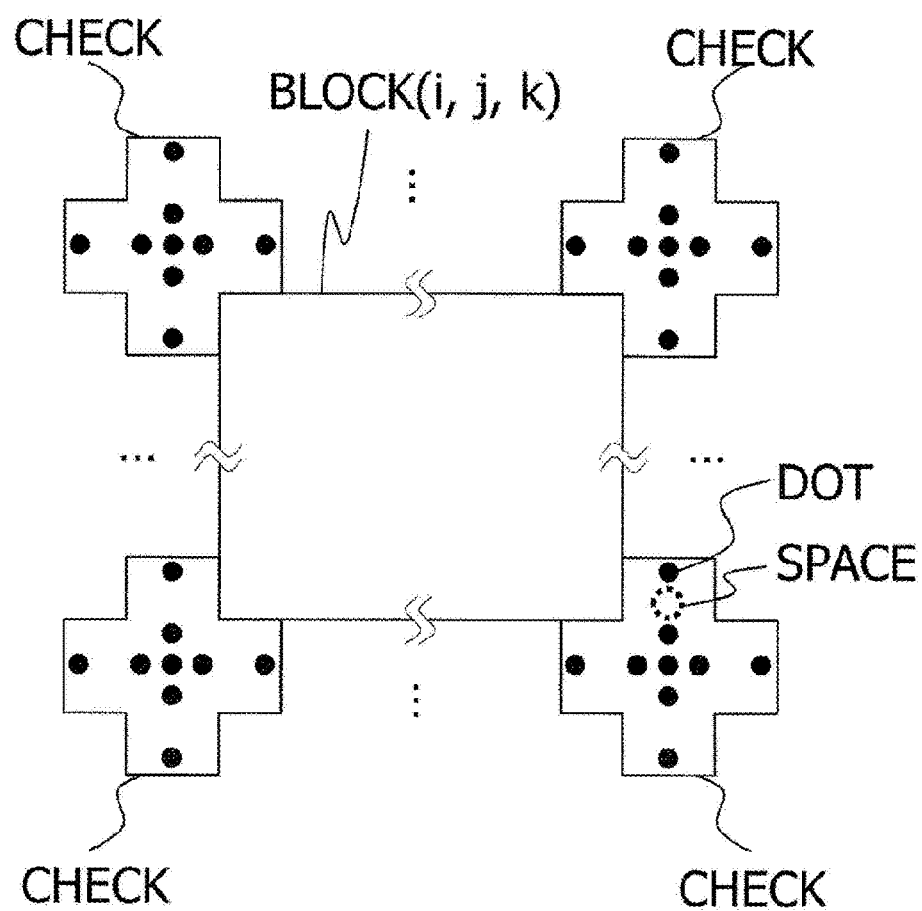
FIG. 6 is an example in which a check pattern is used to be common to a plurality of data blocks.

FIG. 6 illustrates an example suitable for such a purpose in which check patterns are used to be common to a plurality of data blocks. As illustrated in the figure, in this example, cruciform check patterns are arranged in gaps between upper, lower, left, and right data blocks. Accordingly, one check pattern can be used to be common to the upper, lower, left, and right data blocks. In addition, since the check patterns have the cruciform, the area penalty is small. While dots and spaces are aligned vertically and horizontally, three dots are configured to be consecutive in the center portion of the cruciform, and, in this portion, a scheme is employed in which the spatial frequency is configured to be lower than that of a portion positioned on the corner of the cruciform in which a dot and a space are alternately aligned. Accordingly, as described above, an advantage owing to the inclusion of the portion having a different spatial frequency in the check pattern can be similarly acquired.

Example 7

Figure 7:
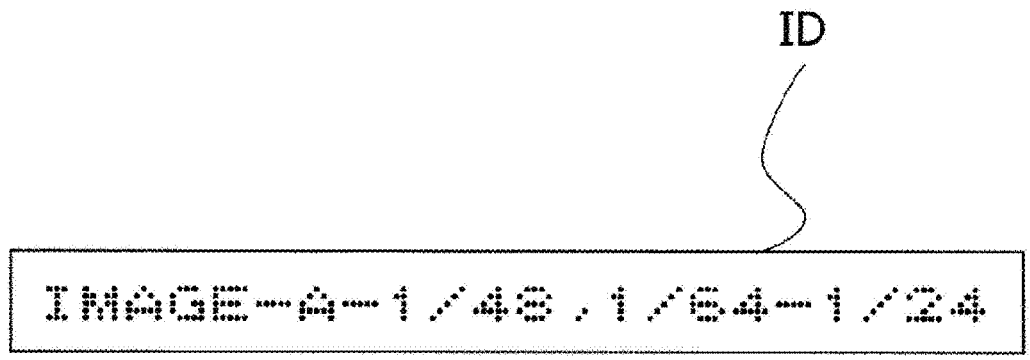
FIG. 7 is an example that illustrates the configuration of the pattern of an ID of a data block.

FIG. 7 is an example that illustrates the configuration of the pattern of an attribute display area ID of a data block. This attribute display area is an area that represents the attributes and the like of data recorded on the periphery of the data block BLOCK. In this example, a font is represented by point drawing using 5×5 dots. Characters have spaces corresponding to one dot therebetween. In this example, a case is assumed in which a full-color image configured by vertical 4,800 pixels and horizontal 6,400 pixels of which the name is IMAGE-A is recorded in a non-compressed manner. When the volume of one data block is assumed to be vertical and horizontal 100 bits, 24 times the data blocks of 48×64 are necessary for the above-described image with an exception for error collection and the like. Since the image is a full-color image, 8 bits are necessary respectively for each one of three colors R (red), G (green), and B (blue), and accordingly, 24 times of the data blocks are necessary. In this figure, an example is illustrated in which text fonts "IMAGE-A-1/48, 1/64-1/24" are recorded. Such fonts may be recorded by point drawing using dots as in this figure or may be recorded by line drawing by slightly shifting the medium with respect to the laser beam at the time of performing a recording process. In addition, the fonts may be recorded as ASCII codes or one-dimensional or two-dimensional codes as digital data.

In the example illustrated in this figure, a leading portion of IMAGE-A is the name of the original image, and a portion of "1/48, 1/64" represents the coordinates when the original data is divided into vertical 48×horizontal 64 areas, in other words, represents a data block corresponding to the vertically first and horizontally first place. A final portion of 1/24 represents the first (for example, the first bit of R) of color information that is configured by 24 bits. When the content of this attribute display area is recorded with a physical position of the data block on the medium being added thereto, a direction of the acquired image in which a remaining data block is present can be determined based only on this attribute display area, which is convenient. Such physical position information may be further added to the information illustrated in this figure. When the portion of "1/48, 1/64" described above is allowed to match the coordinates of the data block in the direction XY on the medium, and the final portion of 1/24 is allowed to match the number of the physical layer, the size of the attribute display area can be reduced.

Example 8

Figure 8:
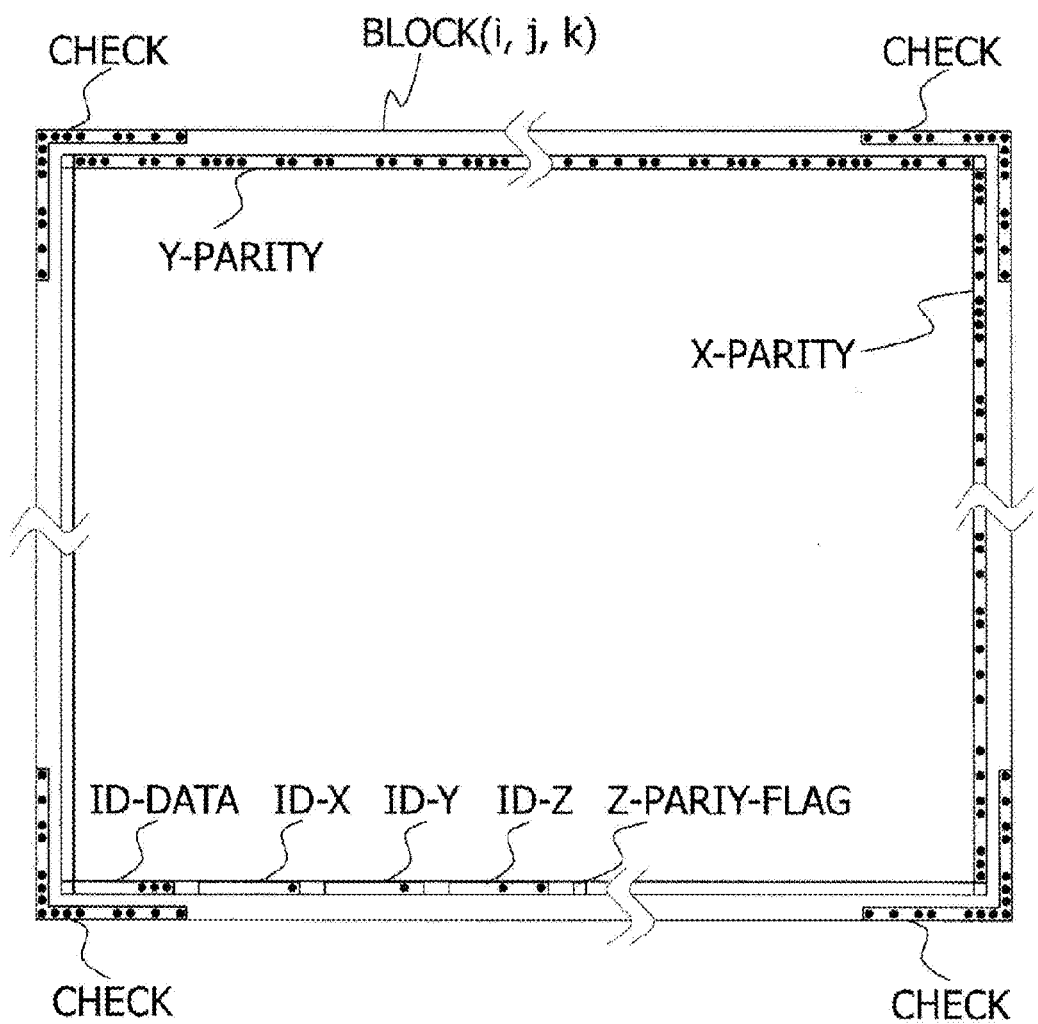
FIG. 8 is an example of a data block that includes check patterns and parity patterns.

FIG. 8 illustrates an example of a data block that includes check patterns and parity patterns. In order to reproduce digital data from an image acquired by capturing a data area inside the data block, a case may be considered in which an error occurs due to variations of the recording quality or the like. In such a case, it is effective to allow an error correction function to be included in each data block or for a plurality of data blocks. FIG. 8 is an example in which a simple error correction function is included for each data block. According to the error correction system of this example, there are advantages that the error correction method is simple, and the area penalty is small. In addition, in a case where a high error rate is predicted due to the recording quality, the reproduction condition, and the like, it is apparent that a more powerful error correction function may be preferably included through a sacrifice of the area.

In a data block BLOCK(i, j, k) illustrated in FIG. 8, check patterns CHECK are disposed on four corners. Such a check pattern is acquired by aligning dots in a rectangular shape. The check pattern is configured such that there are a plurality of spatial frequencies of the dot interval in each one of the directions X and Y of the rectangular portion. Accordingly, the resolutions in the directions X and Y can be checked on the four corners of the data block. In addition, the area penalty is small. A Y-direction parity bit stream Y-PARITY is arranged on the upper side of the data portion arranged on the inner side of the check pattern, an X-direction parity bit stream X-PARITY is arranged on the right side, and an attribute display area ID is arranged on the lower side. The attribute display area is configured by a one-dimensional bit stream so as to decrease the area penalty. ID-DATA, ID-X, ID-Y, and ID-Z configuring the attribute display area ID are bit streams representing the attribute of the data and the coordinates of the data block. In addition, Z-PARITY-FLAG is a flag that represents whether or not the content of the data included in the data block BLOCK(i, j, k) is a Z-direction parity. When there is a dot at this flag position, the data is a Z-direction parity. On the other hand, when there is a space area in which there is no dot at the flag position, the content of the data represents not a Z-direction parity but normal data.

Here, the parity will be described. As is well known, parity is a bit that is used for adjusting a sum of a bit stream to be even or odd. In a case where the sum of a bit stream is configured to be even, when the sum of the bit stream at the time of reproduction is odd, at least one or more odd bits in the bit stream including the parity bit are erroneously reproduced. In a case where an even number of two or more errors occurs, while the errors cannot be detected, however, in a case where the probability of the occurrence of two or more errors is sufficiently low, it can be determined whether or not there is an error using one parity bit. In addition, while a plurality of errors can be detected by increasing the number of parity bits and configuring the remainder of the sum to be constant, the principle is the same, and, here, an example of one parity bit will be described. Hereinafter, whether to record a dot at the position of the parity will be described to be determined such that the number of dots in the directions X, Y, and Z is even. Even in a case where the number of dots is configured to be odd, the operations are similarly performed.

As illustrated in the figure, the Y-PARITY is configured to be either a dot or a space such that the number of dots in the vertical direction except for the check pattern is even. In addition, the X-PARITY is configured to be either a dot or a space such that the number of dots in the horizontal direction except for the check pattern is even. Similarly, the Z-PARITY is configured to be either a dot or a space such that the number of dots in the depth direction in the figure is even. As illustrated in the figure, the X-PARITY and the Y-PARITY may be arranged along one side of the data area. Since the Z-PARITY relates to the sum in the depth direction, all the data of one of a plurality of layers is dedicatedly used for the Z-PARITY. It is apparent that a layer dedicated to the Z-PARITY may be disposed in any layer, here, for the simplification of description, only one layer will be treated as the Z-PARITY. In addition, in order to clarify that a focused data block is the Z parity, the Z-PARITY-FLAG described above is arranged.

A method of correcting an error using such a parity will be described. After data is reproduced, the numbers of dots (bit "1") in the direction Y (row direction) and the direction X (column direction) are checked for each data block. When there is a row or a column in which the number of dots is odd, there is a high possibility that there is an error in the row or in the column. In addition, a sum in the depth direction (direction Z) is also checked, and a row or a column in which the sum is odd is searched. An intersecting bit in the directions of the row, the column, and the depth is regarded as an error bit and is inverted. Even in a case where the number of parity bits is small, in this way, the possibility of the occurrence of an error in the three directions can be checked, whereby the possibility of correcting the error increases.

Example 9

Figure 9A:
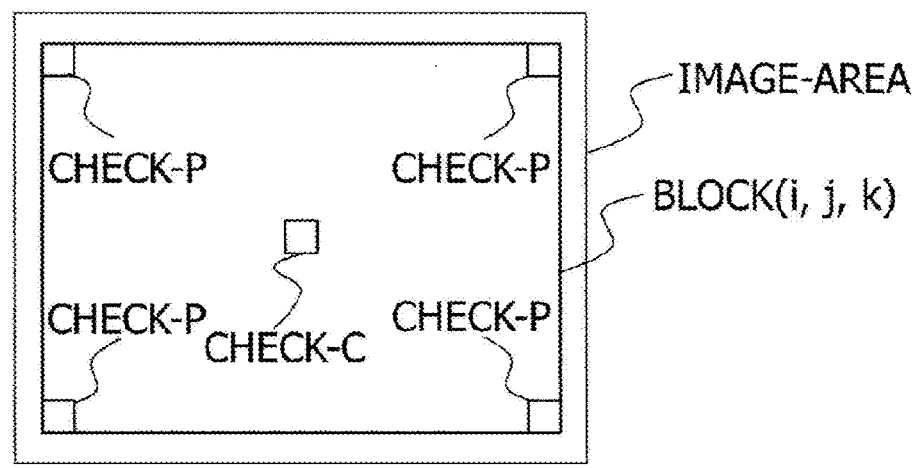
FIGS. 9A and 9B are examples that illustrate the sizes of fields of view.
Figure 9B:
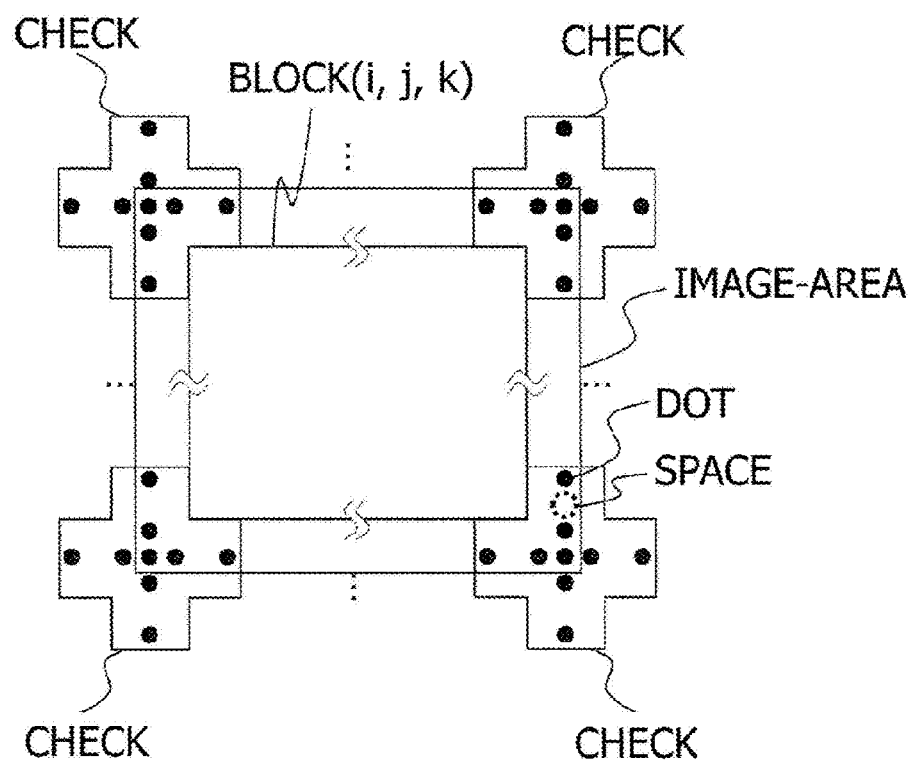

FIGS. 9A and 9B are examples that illustrate the relations between the sizes of fields of view IMAGE-AREA that can be respectively captured by a camera at once and data blocks. FIG. 9A illustrates a case where check blocks are arranged inside each data block, and FIG. 9B illustrates a case where one check block is shared by a plurality of data blocks.

In the case as illustrated in FIG. 9A, at least one data block may fit into the inside of the field of view. In the case as illustrated in FIG. 9B, an field of view into which portions of check blocks necessary for the data block to be reproduced fit in addition to a data block may be formed. It is apparent that, in the case of a camera capable of acquiring a wide field of view with sufficient resolving power, a plurality of data blocks may fit into one field of view so as to be processed together. In addition, in a case where a design for not generating lack of image field according to the optical system is achieved, the field of view IMAGE-AREA of the camera is a range acquired by dividing the area of the image sensor by the optical magnification. Accordingly, by using a camera equipped with an image sensor having a large area or decreasing the optical magnification, the field of view can be formed to be large. However, when an objective lens that does not have necessary resolving power is used, or the optical magnification is arbitrarily lowered, an adjacent dot cannot be resolved to increase the error rate, and accordingly, it is necessary to satisfy the following conditions.

First, it is necessary for the resolving power of the objective lens located close to the medium to be at a level at which a distance between adjacent dots can be resolved. In addition, it is necessary for the distance between adjacent dots formed on the image sensor to be times the pitch of pixels of the image sensor or more. The latter is, as is well known, determined based on the sampling theory. However, actually, a margin is necessary for the latter condition. The reason for this is that a general camera is a color camera, and color information of one pixel is acquired by collecting four (R, G, G, B) pixels respectively having sensitivities to R (red), G (green), and B (blue) and is for additionally inserting a low pass filter preventing moiré right before the image sensor or calculating one unit of pixel information using a plurality of pixels on the camera side. In addition, in the case of multiple layers, images of layers adjacent to each other overlap each other to decrease the signal-to-noise ratio, and accordingly, a margin that is more than that of the case of a single layer is necessary. An experiment was made using fused silica, and, it was found that, in order to adjust the error rate before error correction to be in the order of 0.1% or less, the distance between adjacent dots on the image sensor was needed to be taken to be about a seven pixel pitch although the result depends also on the refractive index of the recording medium. In addition, in the case of multiple layers, although depending on the capturing condition, it was understood that taking a further margin of about 14 pixel pitches is preferable. Thus, it is necessary to design a reproduction system in consideration of such conditions. However, when the magnification is raised too much, the recording area that can be imaged at once decreases, and accordingly, a minimum magnification at which the check patterns can be correctly reproduced is preferably used.

Example 10

Figure 10:
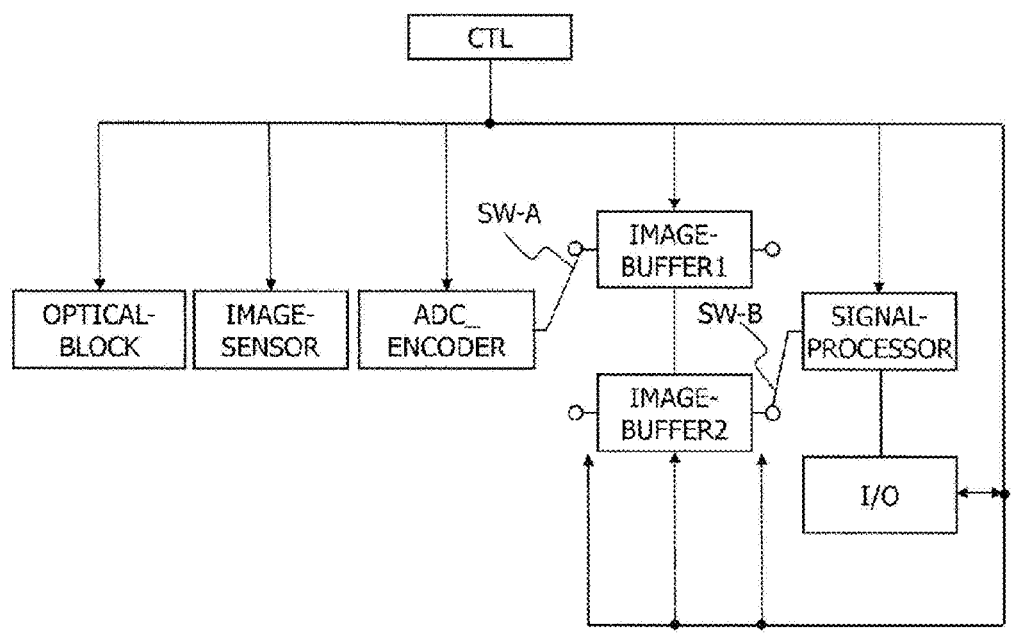
FIG. 10 is an example of a block diagram that illustrates the configuration of a reproduction system.

FIG. 10 is an example that illustrates the configuration of a read system. A control unit CTL disposed on the upper side of the figure controls all the components configuring the read system. An optical block OPTICAL-BLOCK disposed on the left side of the figure includes components of the optical system such as a lens, a lighting device, a diaphragm, a filter, and a focusing mechanism. An image sensor IMAGE-SENSOR is called a CCD, a CMOS, or the like, and an analog-to-digital converter ADC_ENCODER is a circuit that converts the output of the image sensor into a digital signal and encodes the digital signal as image information. Although the image sensor and the analog-to-digital converter are frequently integrated on a semiconductor chip as one body, here, the image sensor and the processing circuit are represented to be divided into blocks. Buffer memories IMAGE-BUFFER 1 and IMAGE-BUFFER 2 temporarily store images. Switches SW-A and SW-B are used for switching between the roles of the buffer memories IMAGE-BUFFER 1 and IMAGE-BUFFER 2 in a manner to be described below. A signal processor SIGNAL-PROCESSOR starts a data block using the image of a check pattern area inside the buffer memory, selects a data block based on the determination of the resolution, and performs signal processing such as data reproduction. An I/O is an image display unit that displays an image that is in the middle of the capturing process and the progress or the result of the process for a user using the read system and an interface block having an input function for transmitting a user's operation result to the read system.

In this example, a motion picture including a plurality of data blocks recorded in a medium is converted into digital image information through the optical block OPTICAL-BLOCK, the image sensor IMAGE-SENSOR, and the digital-to-analog converter ADC, continues capturing for a predetermined time, and records the acquired data in the buffer memory IMAGE-BUFFER 1. During the capturing process described above, four check pattern areas disposed on the periphery of a plurality of data areas included in each frame of motion picture data that has been captured and has been recorded in advance in the buffer memory IMAGE-BUFFER 2 in the previous capturing process are checked, the position of the data area and the resolution of the image of the data area are checked from the images of the blocks included in the check pattern areas, and it is determined whether the data area can be used for the reproduction of data based on whether or not a resolution checking block has been resolved. The image of the qualified data block is cut out, the recording data is reproduced therefrom, a result of the reproduction is recorded in a memory (not illustrated in the figure) included in the signal processor unit, and the result is externally displayed or output through the interface unit, or an access to the internet is made based on the result of the reproduction.

In a case where a data block that cannot be reproduced within the same field of view remains in accordance with performing the capturing process once, again, capturing and processing of a motion picture of a desired time are repeated with capturing conditions such as the focus and the lighting being changed. In a case where the reproduction of one field of view is completed, the field of view is switched to the next field of view, and the reproduction in the next field of view is continued. At that time, by performing switching between the switches SW-A and SW-B, the roles of the buffer memories IMAGE-BUFFER 1 and IMAGE-BUFFER 2 are interchanged. Accordingly, the image that is in the middle of the capturing process is stored in the buffer memory IMAGE-BUFFER 2, and signal processing accompanied with the reproduction is performed using data stored in the buffer memory IMAGE-BUFFER 1.

As described above, in the example of this read system, since the capturing process and the reproduction process are performed as a pipeline process in a parallel manner, the reproduction process can be performed at a speed higher than that of a case where the capturing and the processing are performed in a time series. In addition, in the description presented above, the example has been described in which a motion picture is captured. In such a case, a user can perform the reproduction process without concerning delicate timing (shutter operation) of the capturing process. However, in some cases, still images may be consecutively captured in accordance with a user's shutter operation. In description presented here, for the convenience of the description, the still images that are consecutively captured as above will be referred to as a motion picture.

In addition, the above-described pipeline process can be expected to be performed at a high speed in a reproduction apparatus using an XY stage as disclosed in Takao Watanabe et al., ISOM2012, Mo-D-02, Tokyo (2012). In other words, a case where images of a plurality of layers are captured while the focus being changed in one field of view, and next, the XY stage is moved to the next field of view is equivalent to a case where a plurality of layers are captured, and the XY stage is moved, whereby data of the plurality of layers that have been captured can be reproduced.

An example relating to the configuration of a reproduction apparatus using a camera to which a camera module or a lens is attached, which is available in the market will be described.

Example 11

Figure 11A:
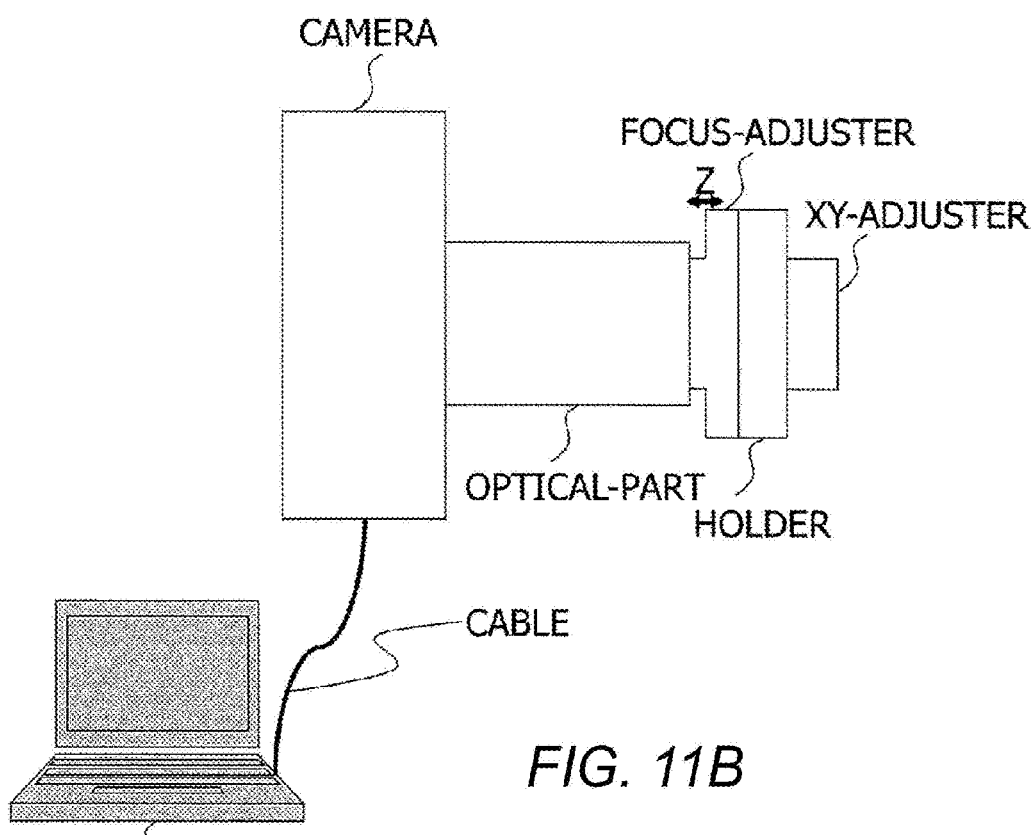
FIGS. 11A and 11B represent a first example that illustrates the configuration of a reproduction system.
Figure 11B:
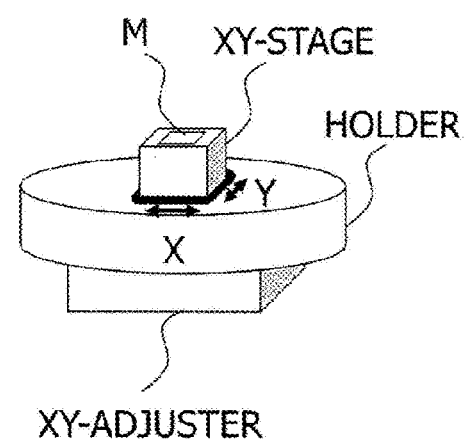

FIGS. 11A and 11B represent a first example that illustrates the configuration of a reproduction system. This example is suitable for a case where a reproduction system is configured by using a camera of the type for outputting an image to a personal computer, for example, a USB camera module.

FIG. 11A is a diagram that illustrates the whole configuration, and FIG. 11B represents an overview diagram illustrating a part that drives a recording medium in a direction perpendicular to the optical axis. As illustrated in FIG. 11A, the reproduction system of this example is configured by: a personal computer PC; a cable CABLE that connects the personal computer PC and a camera together; the camera CAMERA that photographs an image; an optical system OPTICAL-PART that is used for forming an image of a data block of a transparent medium on an image sensor disposed inside the camera; a focus adjuster FOCUS-ADJUSTER that adjusts a distance between the optical system and a recording medium M, a holder HOLDER that installs the recording medium M to the camera; and an XY adjuster XY-ADJUSTER that moves the recording medium M within the XY plane in a direction perpendicular to the optical axis.

In FIG. 11B, an XY stage XY-STAGE that fixes the recording medium M installed to the inside of the reproduction system, the XY adjuster XY-ADJUSTER that drives the recording medium within the XY plane, and the holder HOLDER that fixes the above-described components to the focus adjuster FOCUS-ADJUSTER are illustrated. The focus adjuster FOCUS-ADJUSTER and the XY adjuster XY-ADJUSTER are respectively configured to include a small-size motor and are controlled by using the personal computer PC. According to the configuration described above, a motion picture can be captured while the recording medium is driven in the direction XYZ (here, Z is the direction of the optical axis) with respect to the focal position of the camera. The recording medium M is fixed to the optical system through the focus adjuster FOCUS-ADJUSTER, and stray light does not enter the recording medium M from the outside. Accordingly, in a general residential space, the image of a data block included in the inside of the recording medium can be captured as a motion picture facilitating the composition rule, focusing, the capturing timing, and the like without shaking the camera.

In the captured data block, check patterns used for checking the resolution are included, and accordingly, an image having high resolution can be selected from among the captured motion pictures and, and the data thereof can be reproduced. In addition, in order to suppress the cost of the reproduction system, it is apparent that any one or both of the focus adjuster FOCUS-ADJUSTER and the XY adjuster XY-ADJUSTER is configured to be manually movable. Particularly, in a case where the field of view is sufficiently large with respect to the recording area, delicate adjustment in the direction XY is not necessary, and accordingly, there are cases where a reduction in the capturing efficiency can be suppressed by manually operating the XY adjuster XY-ADJUSTER. In addition, in this example, control software that operates on the personal computer PC needs to be prepared. Since a general camera module is equipped with driver software operating on the personal computer PC, software can be easily developed at an ordinary technology level.

Although there are cases where the pipeline operation as illustrated in FIG. 10 cannot be performed due to the restriction on the personal computer PC, in such cases, software performing the reproduction process after capturing a motion picture may be produced.

Example 12

Figure 12A:
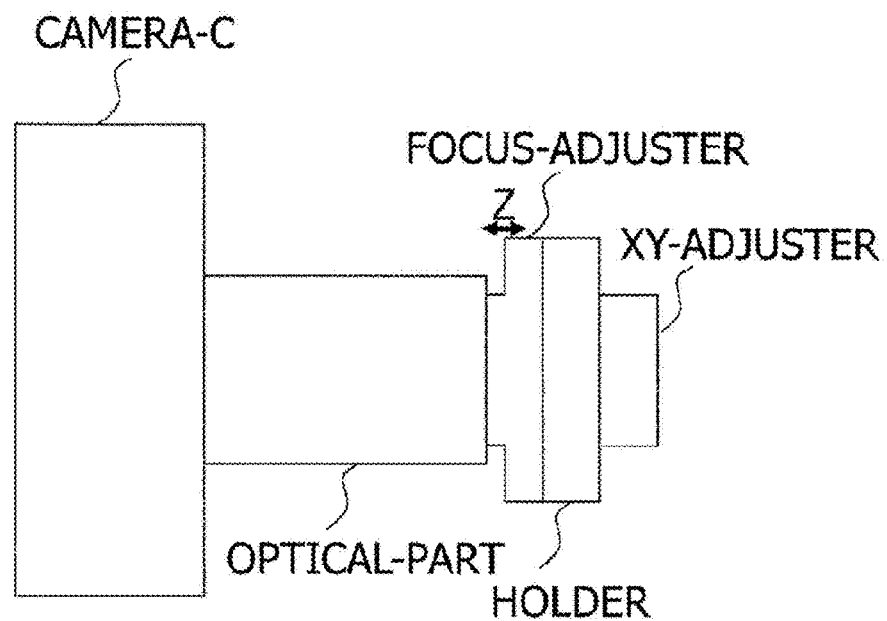
FIGS. 12A to 12C represent a second example that illustrates the configuration of a reproduction system.
Figure 12B:
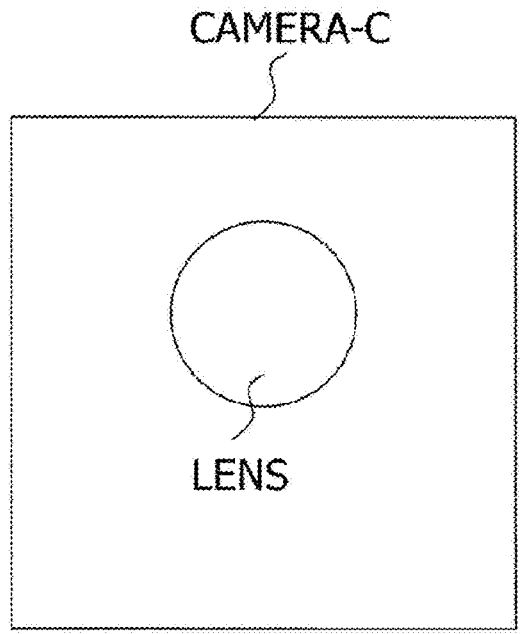
Figure 12C:
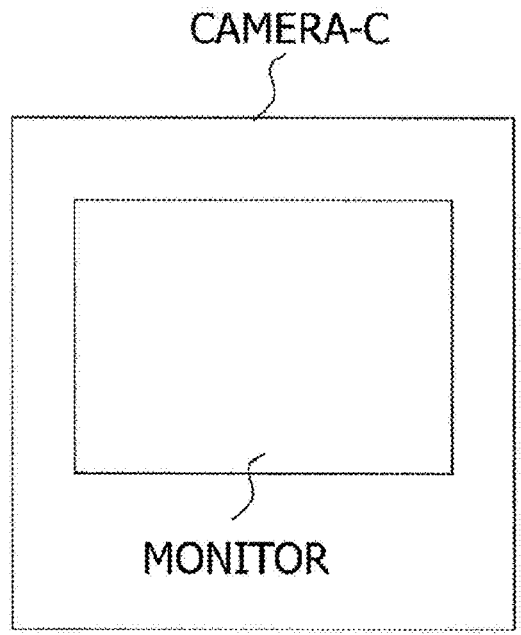

FIGS. 12A to 12C represent a second example that illustrates the configuration of a reproduction system. This example is suitable for configuring a reproduction system using a small mobile-type camera CAMERA-C to which a lens is originally installed as the base.

FIG. 12A is a diagram that illustrates the whole configuration seen from the side face. Basically, this configuration is the same as the example represented in FIGS. 11A and 11B, but the lens is originally installed to a camera main body, and accordingly, an optical system thereof can be simplified as will be described later. The optical system will be described later. A strong point thereof is that reproduction not using the personal computer PC can be performed unlike FIGS. 11A and 11B. In cameras and camera-attached mobile devices that are currently available in the market, a motion picture capturing function is built in as the standard. Accordingly, the capturing of a motion picture and the recording of the motion picture can be performed not using a personal computer PC. Therefore, software for extracting still images from captured motion picture information and reproducing the extracted still images may be developed. Since a function for outputting a frame of a specific time from a motion picture as a still image is frequently built as the standard, the reproduction software can be easily developed at the ordinary technology level.

FIG. 12B is a front view of the camera CAMERA-C. FIG. 12C is a rear view of the camera CAMERA-C. Since a liquid crystal screen monitor MONITOR is attached to the camera, checking of an image or a display of a reproduction result can be performed through this liquid crystal screen monitor.

According to this example, since the reproduction process can be performed not using a personal computer PC in a normal residential space, the reproduction process can be performed in a simpler manner. Here, while the description has been made on the premise of the lens-attached camera, it is apparent that the reproduction apparatus may be configured using a so-called digital single lens reflex of the lens exchange type as the base.

As described above, minute structural changed areas generated by focusing short laser pulses inside the transparent medium have a low contrast level. As disclosed in E. N. Glezer, et al., "Three-dimensional optical storage in side transparent materials", Opt. Lett., Vol. 21, No. 24, pp. 2023-2025 (1996), in a case where observation is performed using a microscope having a high numerical aperture, the observation can be performed at high contrast, however, in a read system used for a reproduction process by a general user in an ordinary residential area, it is necessary to use an optical system having a numerical aperture lower than a research microscope and a low magnification. Accordingly, even in such a simple optical system, an optical block OPTICAL-BLOCK capable of capturing the minute structural changed areas with high contrast is necessary.

Example 13

Figure 13:
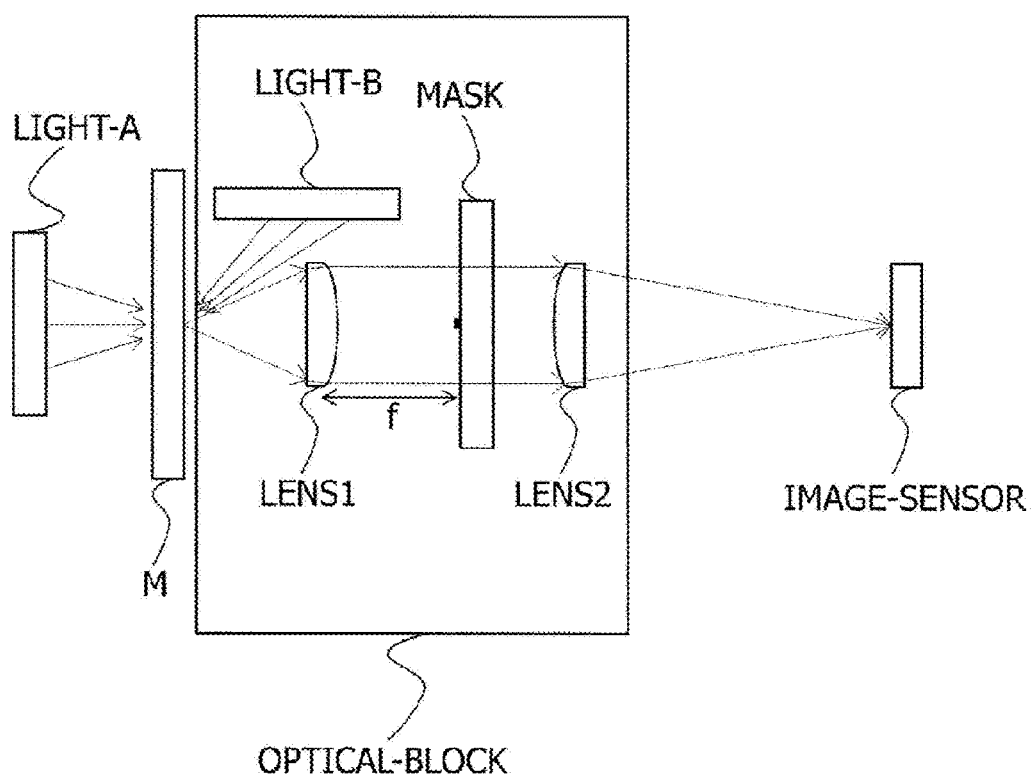
FIG. 13 is a first example that illustrates the configuration of an optical block in the reproduction system.

FIG. 13 is an example of such an optical block. First, the configuration thereof will be described with reference to the figure. As illustrated in the figure, the optical block OPTICAL-BLOCK is configured by two convex lenses LENS 1 and LENS 2 and a mask MASK. In FIG. 13, the two convex lenses LENS 1 and LENS 2 described above are arranged so as to form so-called infinity correction type optics. The convex lens LENS 1 serves as an objective lens, and the convex lens LENS 2 corresponds to an imaging lens. In addition, the mask MASK is arranged at a position separated away from the convex lens LENS 1 by the focal distance thereof. The mask MASK is a parallel flat plate formed using a transparent material such as optical glass, and the upper side of the glass is coated with a thin film that is used for changing the transmissivity of light. The mask MASK is one kind of filter being changed the transmissivity of light such that the transmissivity near the optical axis is lower than that of the peripheral portion.

According to the objective lens LENS 1 of the infinity correction type optics as described above, an object that is separated from the objective lens LENS 1 by the focal distance thereof is in-focused (more precisely, since there is an influence of the spherical aberration according to a difference between the refractive index of the medium and the refractive index of the air, and, in a case where the influence causes any problem, it is corrected by using a lens, but, here, for the simplification of description, such an influence will not be considered). On a side of the objective lens LENS 1 opposite to the medium, at a position separated from the objective lens LENS 1 by the focal distance, a Fourier-transformed image of a dot image that is in-focused is generated. Accordingly, the intensity of a component transmitted through a place located near the optical axis in the mask located at such a position, in other words, a low frequency component can be configured to be relatively weaker than the intensity of a high frequency component that is separated from the optical axis. As a result, light rays that are strongly scattered on the dot are emphasized, and a slight difference in the refractive index in the dot can be emphasized.

While lighting devices LIGHT-A and LIGHT-B illustrated in the figure are not illustrated in FIGS. 11A and 11B and 12A to 12C described above and in examples illustrating configurations of the reproduction systems to be described later, the installation thereof to the system is easy, and thus, description of an installation method thereof will not be presented. In addition, in this figure and figures relating to examples to be described later, in order to simplify the figures, while the simplified configuration of lenses is represented, it is apparent that, in order to correct various aberrations, a lens drawn as one lens in the figure may be configured by using a plurality of lenses, or an aspherical lens may be used. For example, in order to relatively suppress the cost and achieve a configuration having high contrast and high resolution, it is effective to use not a single lens but to use an achromatic lens of which the chromatic aberration, the spherical aberration, and the like are corrected for acquiring the image of a dot having high contrast. In addition, since the lighting device LIGHT-A lights the recording medium M from the rear side, in order to secure an optical path thereof, it is apparent that a hole used for securing the optical path of the lighting device is formed in a component such as the XY stage XY-STAGE that fixes the medium M.

The lighting device LIGHT-A is a transmission lighting device that lights the recording medium M from the opposite side of the lens. Here, the lighting device that collects light toward the medium part is used assuming that a condensing lens is disposed inside the lighting device, and the angle of the light collection is adjusted such that minute structural changed areas of the medium are seen to have high contrast. In order to reduce the cost, an appropriate diaphragm may be arranged in a diffusion lighting device having no condensing lens so as to replace the condensing lens. In addition, in a case where the optical magnification is low, a bright lighting device is not necessary, and thus, external light at a place at which the reproduction system is used may be used. In such a case, in the example of the configuration of the reproduction system illustrated in FIGS. 11A and 11B or 12A to 12C or the configuration of a reproduction system to be described later, a simple method may be used in which the external light is received from a hole that is open in the stage, and the recording medium is lighted from the rear face. In a case where the non-uniformity of the external light causes any problem, by blocking the hole that receives the external light therein using a semi-transparent tape or the like, the influence of the non-uniformity can be reduced.

The lighting device LIGHT-B is used for lighting the medium M at an inclined angle. The medium M is lighted at an angle for which light reflected from the surface of the medium M is not incident to the image sensor through the lens as stray light. According to the performance of the lens of the optical system and the shape of the dot, by using such lighting devices together, the dot can be captured with higher contrast. In a case where sufficient contrast is acquired by using any one of the lighting devices, it is apparent that only the single lighting device may be used.

In a case where a low-cost lens having insufficient correction of the chromatic aberration of the optical system is used, by using a monochromatic lighting device or using a filter that limits a transmission spectrum, blurring due to the chromatic aberration is reduced, whereby an image having high contrast can be acquired. For example, a green light emitting diode may be used. In such a case, when a color image sensor is used, by using only a component of G (green) from among the output of R (red), G (green), and B (blue), even in a case where stray light is incident from the outside in addition to the lighting devices, the influence thereof can be suppressed, whereby the contrast level can be raised. It is apparent that the same advantage is acquired by using a blue or red light emitting diode and using only B or R out of the output components of the image sensor.

In addition, there are white light emitting diodes having a spectrum peak in the area of blue, and, in a case where such a white light emitting diode is used, a blue component of the image sensor may be used. In a case where a single-plate color image sensor is used as the image sensor, pixels respectively having sensitivity to R, B, and G are two-dimensionally aligned in an arrangement called a Bayer array. Accordingly, in such a case, the number of pixels having sensitivity to G is about twice as many as the number of pixels having sensitivity to R or B. In such a case, by using a green light emitting diode as the lighting device, there are advantages in terms of the sensitivity of the image sensor and the resolution compared with a case where a light emitting diode of any other color is used. Instead of utilizing a difference in the color sensitivity of pixels of the image sensor, a filter cutting out light of a wavelength other than a portion of the light emission spectrum of the lighting device LIGHT that has a high intensity may be inserted between the lenses LENS 1 and LENS 2. Particularly, in a case where a monochromatic image sensor is used, the sensitivity of pixels is high in a wide spectrum, and accordingly, the method using the filter is effective.

Subsequently, the operation principle of the example represented in FIG. 13 will be described. As illustrated in the figure, light scattered by the minute structural changed areas formed inside the medium passes through the first lens LENS 1 and then becomes parallel luminous fluxes, is transmitted through the mask MASK and the second lens LENS 2, and is imaged on the image sensor IMAGE-SENSOR. Since the lenses LENS 1 and LENS 2 form the infinity correction type optics as described above, a gap therebetween can be freely adjusted in a range in which lack of image field of the image does not cause any problem. In addition, the mask MASK described above is disposed at a position separated from the objective lens LENS 1 by the focal distance f thereof. The mask MASK, as described above, has a filter function for lowering the transmissivity of light near the optical axis than that on the periphery. At a position separated from the lens LENS 1 by the focal distance thereof, a Fourier transformed image of the image of the dot group disposed inside the recording medium is formed. Accordingly, near the optical axis, light that is emitted from the lighting device LIGHT-A and transmits through the recording medium M without being scattered on the dots passes. By reducing this light using the mask MASK, the image of dots can be captured to be brighter than a portion in which there is no dot so as to be distinctive. As disclosed in E. N. Glezer, et al., "Three-dimensional optical storage in side transparent materials", Opt. Lett., Vol. 21, No. 24, pp. 2023-2025 (1996), it is known that, in the image of a dot, there are a position seen to be brighter than the periphery thereof and a position seen to be darker than the periphery when the focal position of the optical system is changed. By using the above-described mask at the focal position at which the dot is seen to be bright, a portion in which there is no dot is shown up to be darker, and the contrast of the image of the dot can increase. By configuring the lighting device LIGHT-A to emit parallel luminous fluxes or light close to parallel light, light that is not scattered by the dots is concentrated near the optical axis. Since the degree of light concentration of the lighting device influences the resolving power, adjustment may be performed such that both the contrast and the resolving power are necessary and sufficient.

In addition, in a case where dots are shown up with sufficient contrast according to the brightness of the lighting device or the aberration correction of the lens without using the mask described above, in order to reduce the cost of the reproduction system, it is apparent that the mask MASK may be omitted.

The above-described example is suitable not only for the reproduction system illustrated in FIGS. 11A and 11B but also for a case where the reproduction system is configured by using a device in which the camera function is built in the main body in advance such as a cellular phone or a smartphone as illustrated in FIG. 12A to 12C. It can be easily understood that the optical system as illustrated in FIG. 13 can be formed by externally adding the object lens LENS 1 with the lens of the camera that originally belongs to the main body being regarded as the imaging lens LENS 2.

When a value acquired by dividing a distance between dots imaged on the image sensor by the actual size of the inter-dot distance inside the medium that is a subject is defined as an optical magnification, the value is acquired by dividing the focal distance of the lens LENS 2 by the focal distance of the lens LENS 1 that is the objective lens. Accordingly, by selecting the ratio between the focal distances of both the lenses, the optical magnification can be changed. In a case where any one of the lenses is a zoom lens, by changing the zoom ratio, the magnification can be conveniently adjusted.

In the above-described example, the transmissivity of the mask MASK is lowered near the center with the focal position being set as a position at which the dot is seen to be bright. Depending on the situation, there is a case where it is convenient to acquire an image at the focal position at which a dot is seen to be dark. In such a case, the transmissivity of the mask described above may be configured to be higher near the center than on the periphery. In such a case, the intensity of light that is not scattered by a dot increases, whereby the periphery of the dot can be captured to be brighter than the dot. In other words, the dot can be captured with high contrast. However, in such a case, when the light is reduced with the intensity of light of the peripheral portion to be surplus by using the mask, the light scattered by the dot decreases, whereby the dot portion may be a blurred image. In such a case, it is effective to apply a high pass filter by performing image processing after the capturing process or perform the capturing process without using the mask and perform image processing for increasing the contrast.

Example 14

Figure 14:
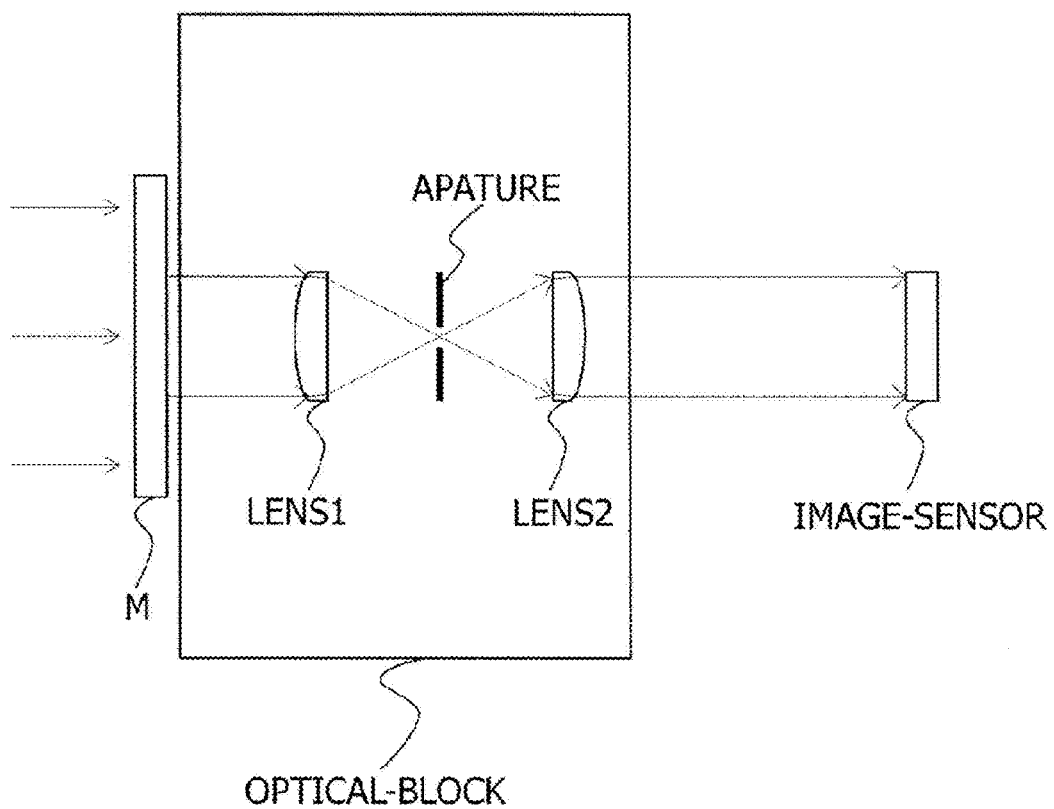
FIG. 14 is a second example that illustrates the configuration of an optical block in the reproduction system.

FIG. 14 represents a second example that illustrates the configuration of an optical block that is suitable for a reproduction system. In this example, instead of the mask as illustrated in the example represented in FIG. 13, an aperture, that is, a diaphragm is used. Since the aperture is used, only luminous fluxes near the optical axis are used. In the aperture APATURE, a hole through which luminous fluxes are transmitted is open at the center thereof, and the center coincides with the optical axis of the lens. A distance between the lens LENS 1 and the aperture APATURE is configured to be the same as the focal distance of the lens LENS 1, and a distance between the lens LENS 2 and the aperture APATURE is configured to be the same as the focal distance of the lens LENS 2. The distances from both lenses are the focal distances of the lenses, which is different from the arrangement of the lenses in the example described above. The optical magnification of this configuration, as can be easily known, is determined based on the ratio between the focal distances of the two lenses, and the magnification increases as the focal distance of the lens LENS 1 disposed on the medium side is shorter than the focal distance of the lens disposed on the image sensor side. The consideration of the minimal magnification that is necessary is the same as that described above.

In this example, as the lighting device, only the transmission lighting device that lights the medium M from the opposite side of the lens is used. In addition, in order to improve the effect of this example, it is preferable that a lighting device emitting luminous fluxes that are approximately parallel to the optical axis be used. As illustrated in the figure, the luminous fluxes travelling parallel to the optical axis pass through the hole located in the center portion of the above-described aperture APATURE and uniformly light the image sensor IMAGE-SENSOR through the lens LENS 2. Accordingly, when there is nothing causing light to be scattered in the medium, an image having uniform brightness can be acquired. In the medium, since dots that are minute structural changed areas are present, light scattered by the dots does not pass through the aperture APATURE and is shown up to be dark on the image. As the size of the hole of the aperture APATURE decreases, only luminous fluxes that are approximately parallel are transmitted, and the contrast is improved, but the resolution decreases. Accordingly, the size of the hole is adjusted in accordance with the pitch of dots and a gap between bits configured by a plurality of dots. Accordingly, also in this example, the dot area included in the transparent medium can be captured with high contrast.

In this example, the arrangement of the lenses is referred to as a so-called both-side telecentric lens. According to such a lens configuration, there is a strong point that the size of the image hardly changes even in a case where a distance between the subject and the lens changes, and the image is blurred. Accordingly, as described above, this example is suitable when a resolution check block having a plurality of spatial frequencies is arranged in the check pattern area, and components up to a frequency of some degree from an out-of-focus image are used. Even when an image is out-of-focus, the magnification of the image does not change, and accordingly, any other image having a focal position different therefrom can be easily composed.

In addition, according to the lens configuration of this example, the size of the image can be easily corrected in a case where the surface of the medium M is inclined with respect to the optical axis. The image acquired in this example, as described above, is a projection image. Accordingly, in a case where the medium M is inclined with respect to the optical axis by an angle θ, the size in that direction is seen to be reduced by cos θ. When the above-described reduction ratio is calculated by measuring a distance between portions, in which dots are finely formed, of the center portions of the check patterns disposed on the four corners of the data area, a correction according to the inclination of the medium can be easily made.

The example represented in FIG. 14, similar to the example represented in FIG. 12A to 12C, is also suitable for a case where the read system is configured by using a device in which the camera function is built in the main body in advance such as a cellular phone or a smartphone. By externally adding the object lens LENS 1 corresponding to the objective lens with the lens of the camera that originally belongs to the main body being regarded as the imaging lens LENS 2, the optical system as illustrated in FIG. 14 can be configured.

In addition, when a lens configured by a plurality of lens groups is used as the objective lens in the configuration illustrated in FIG. 13 or 14, or when the imaging lens LENS 2 is used as the camera lens of a cellar phone, a smartphone, or the like in the example illustrated in FIG. 14, the outer focal position may not be located outside the main body lens. When the focal position is not located outside the lens, a mask or an aperture cannot be installed, and, in such a case, the focal position may be configured to be outside the lens by adding a lens. Such a change can be easily designed by an engineer having the knowledge of optics, and thus, detailed description thereof will not be presented.

Example 15

Figure 15:
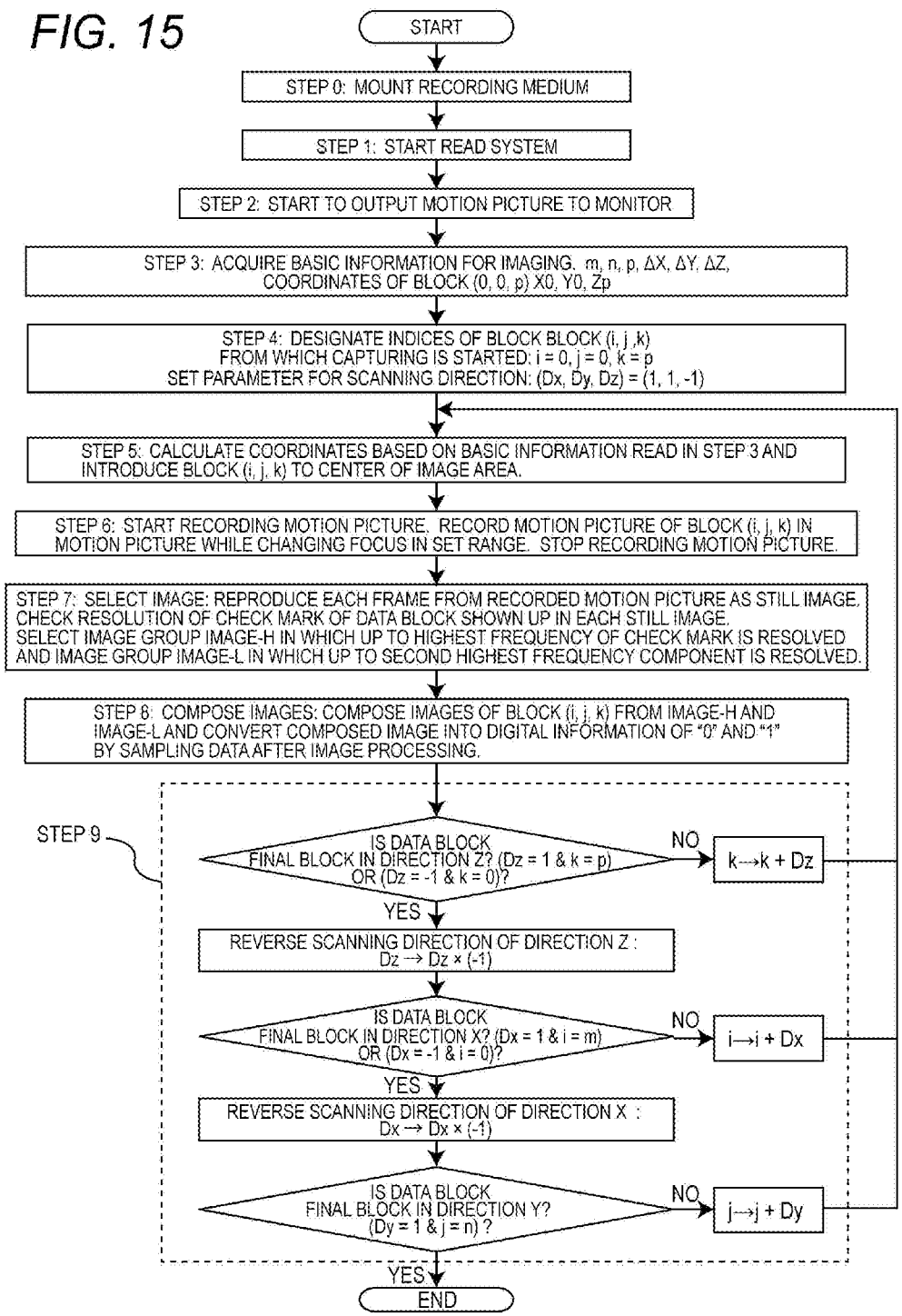
FIG. 15 is an example of a flowchart that illustrates a reproduction method.

FIG. 15 is an example of a flowchart of a case where data is reproduced while a motion picture is captured from a recording medium in the present invention. In the basic flow, movement of the focal position of the camera and the movement of the field of view in the direction XY, in other words, three-dimensional scanning is performed while a motion picture is captured, an image is selected based on the checking of the resolution according to the check patterns, and digital data using the selected image is extracted. In the three-dimensional scanning, a plan for shortening the scanning time has been devised. Hereinafter, the flow of the process will be sequentially described with reference to the figure.

First, in the first step STEP 0, a recording medium is mounted.

In the next step STEP 1, the reproduction system is started.

In the next step STEP 2, a motion picture is started to be captured, and the motion picture is started to be output to the monitor. Accordingly, since the image of a captured portion can be visually checked, a countermeasure such as stopping the reproduction system in a case where there is a malfunction and starting over the process can be easily performed.

Next, from STEP 3, data is started to be reproduced. First, basic information used for imaging is acquired. The basic information may be written as characters in a visually determinable size in an area not overlapping the data block of the recording medium, be read out, and be input to the reproduction system by a user. Alternatively, it may be configured such that the basic information is recorded as a digital code, for example, a two-dimensional bar code in a specific data block, the block is captured and the content thereof is decoded in this step, and a value may be set in the reproduction system. As the basic information, the followings are necessary. First, m, n, and p represent information relating to the number of data blocks recorded in the medium. The number of the data blocks in the direction X is (m+1), the number of the data blocks in the direction Y is (n+1), and the number of the data blocks in the direction Z, that is, the number of layers is (p+1). Here, ΔX, ΔY, and ΔZ are pitches between the data blocks, that is, information relating to the distances. ΔX is a pitch in the direction X, ΔY is a pitch in the direction Y, and ΔZ is a pitch in the direction Z, that is, information relating to the distance between layers. Based on such pitches, a movement distance at the time of scanning, which will be described later, is determined. In this example, while an example will be illustrated in which movement is made for each block, in a case where a plurality of blocks fit into the field of view of the camera, the movement amounts in the directions X and Y are an integer multiple of ΔX and an integer multiple of ΔY. In addition, the center coordinates of the data block used as the reference for the coordinates are necessary. In this example, since BLOCK(0, 0, p) is used as the reference, the center coordinates X0, Y0, and Zp are set. In addition, the indices i, j, and k of the data block BLOCK(i, j, k) are assigned such that a data block closest to the upper left lens side is set as BLOCK (0, 0, 0), and the indices increase in the directions X, Y, and Z. In other words, BLOCK(0, 0, p) represents an innermost data block that is disposed on the upper left side. Information indicating the coordinates of this block is X0, Y0, and Zp. In this example, while the origin of the coordinates is the upper left corner of the surface seen from the lens side out of eight corners of the medium as a rectangular parallelepiped, in a case where the corner of the medium is set as the origin, there is a concern that it may be difficult to detect the origin in a case where the corner of the medium is missing. In a case where there is such a concern, a mark that represents the origin may be recorded on the surface of the medium or the inside of the medium using a laser beam.

In the next step STEP 4, the indices of the block BLOCK(i, j, k) that is introduced to the center of the field of view at the time of starting capturing are designated. In this example, the indices of the start block are set as i=0, j=0, and k=p, and capturing is started from the block BLOCK(0, 0, p). In addition, in this step, parameters (Dx, Dy, Dz) that represent the scanning directions are set. Here, the parameters are set to "1" in a case where scanning is performed such that coordinates increase in the directions X, Y, and Z and are set to "−1" in a case where scanning is performed such that coordinates decrease in the directions X, Y, and Z. Here, Dx is set to "1", Dy is set to "1", and Dz is set to "−1". As above, the setting of the basic information is completed.

In the next step STEP 5, by using the basic information read until now, data blocks BLOCK(i, j, k) that are capturing targets are introduced into the field of view. When the process arrives at this step for the first time, the first data block BLOCK(0, 0, p) is introduced into the center of the field of view.

Subsequently, in step STEP 6, recording of a motion picture is started. At this time, capturing is performed while the focal position is changed in a predetermined range. When the medium is gradually moved in the scanning of the direction Z at that time, the movement direction of the medium is not reversed. Accordingly, the movement of the focus can be smoothly performed without being influenced by the looseness of a screw of the operation part or the like. Accordingly, in the introduction step, it may be configured such that a position that is slightly out-of-focus is set, and a predetermined distance in the direction Z is scanned. When the movement of the focus is completed, the recording of the motion picture is stopped.

In addition, in a case where capturing is performed while the focus is moved, a motion picture of a predetermined time may be captured at the same position while the movement of the focus is stopped, or capturing may be performed for a frame rate of a motion picture of each one second while the focus is slowly moved. In the former case, while the movement speed is low, there are cases where a random noise may be included for each frame in the capturing process performed at the same position. In such cases, when a plurality of frames can be captured at the same position, the influence of the random noise decreases at the time of composition to be described later, and accordingly, the S/N can be raised.

In the next step STEP 7, each frame is reproduced as a still image from the motion picture recorded in step STEP 6, and the resolution of a check mark of the data block that is shown up in each still image (frame) is checked.

As a result, among the plurality of frames, an image group IMAGE-H that is resolved up to a highest frequency of the check mark and an image group IMAGE-L that is not resolved up to the highest frequency but is resolved up to a second high frequency component are selected.

In the next step STEP 8, selected image groups are composed as information of one still image, and data is extracted therefrom. In other words, the image of the block BLOCK(i, j, k) is composed from the image groups IMAGE-H and IMAGE-L. When the number of selected images is large, the S/N of the composed image can be raised. In order to further raise the S/N of the image after the composition, as is necessary, a spatial filter process such as an unsharp process is performed.

The unsharp process is one type of high pass filter that subtracts an image acquired by applying a blurring filter to the composed image from the composed image or by dividing the composed image by the image acquired by applying a blurring filter to the composed image. According to this filter, blurring due to the influence of a slight positional deviation of the image at the time of composing a plurality of images or a blurring low-frequency component (inter-layer crosstalk) of an adjacent layer of a case where there are multiple layers can be weakened, whereby the S/N of the composed image can be raised.

A specific composition method will be described later with reference to FIGS. 24A and 24B. Since there is a case where the S/N is not sufficient in one frame of a motion picture, it is effective to raise the S/N by composing a plurality of frames as described above. In a case where a sufficient S/N can be acquired using one or a plurality of frames included in the image group IMAGE-H, it is apparent that the images of the image group IMAGE-L do not need to be used for the composition. Also in such a case, since dot arrangements in which dots are arranged at the highest frequency and the second high frequency that is lower than the highest frequency are included in the check pattern, when a best focal position at which dots are resolved at the highest frequency is searched, it can be known that the focal position is approximately matched based on the appearance of the resolution of dots arranged at the second frequency, and there is an advantage that the composition can be corrected by detecting a dot portion arranged at the second frequency in the check pattern even in a case where there is a deviation in the focus more or less.

Subsequently, data is sampled from the acquired image, and the image is converted into digital information of "0" and "1". Here, the sampling represents sampling of the density of pixels at a dot position or a space position within the data block. In an image acquired by extracting digital data by binarizing the sampled data using an appropriate threshold, a check mark is shown up with sufficient resolution, and accordingly, the pitch at the time of sampling the image and the size of the data block can be acquired.

While the sampling is performed by acquiring a distance between adjacent dots using the check pattern as described above and acquiring the density of pixels for each calculated distance by using the acquired distances, there may be cases where the pixels to be sampled and the center of the dot image are slightly deviated from each other. In such cases, a minimum value of the values of the pixels to be sampled and the peripheral pixels thereof may be used as a sampling value. The reason for this is that, in a case where a dot is shown up to be dark, by taking a minimum value of the values of the peripheral pixels as described above, a pixel located at a darkest place on the dot image can be selected. On the other hand, in a case where a dot is shown up to be bright, it is apparent that a maximum value may be taken. In addition, since the value of the space portion is the same as the values of the peripheries, a deviation in the sampling values of the space portions is not large to cause a problem by using the above-described method. In addition, the range in which the peripheral pixels are used may be acquired by selecting a range included in a half of the distance between adjacent dots acquired from the check pattern. Furthermore, in a case where a random noise is high, before the above-described minimum value (or the maximum value) is selected, by taking an average from a narrow range such as a range in which a pixel located at the sampling position and the peripheral pixels thereof are included and then performing the above-described calculation, the influence of the random noise can be avoided.

The above-described threshold used for the binarization process may be set as a value for which a dot and a space of the check mark portion can be separated from each other without any error. Here, while the capturing operation and the processing operation are sequentially performed, similar to the example of the block configuration of the reproduction system described above, the operations may be performed in a pipeline manner. In addition, similar to the example illustrated in FIG. 8 described above, in the case of data of which the error can be corrected, it is apparent that the error correction is made at a time point at which necessary data is collected.

In the flow described below, while the medium is three-dimensionally scanned, the above-described steps STEP 5 to STEP 8 are repeated. Since the process can be easily understood by referring to the branching method illustrated in the figure, details thereof will not be described in the sentence. When the process up to a data block disposed on the corner in the direction Z is completed, the focus is moved by one block in the direction X, and the data blocks are scanned in a direction opposite to the direction Z. In addition, when the process of a data block disposed on the corner in the direction X is completed, the focus is moved by one block in the direction Y, and the data blocks are scanned in a direction opposite to the direction X. The reversal of the scanning direction is automatically performed by the reproduction system by inverting the signs of the parameters Dz and Dx that are used for determining the scanning direction. As above, according to this example, by performing zigzag scanning, the movement of the medium or the focal position of the reproduction system is minimized, whereby a time required for the reproduction can be shortened.

Example 16

Figure 16A:
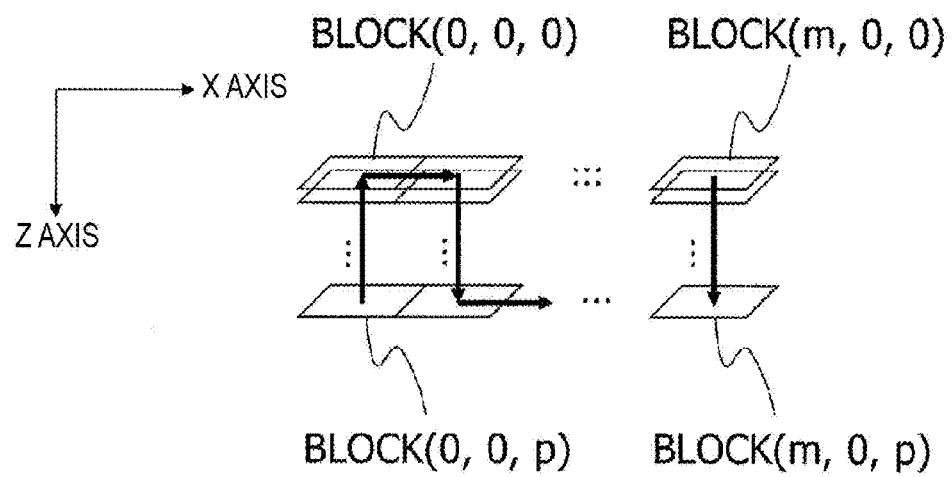
FIGS. 16A and 16B represent an example that illustrates a scanning method in the reproduction system.
Figure 16B:
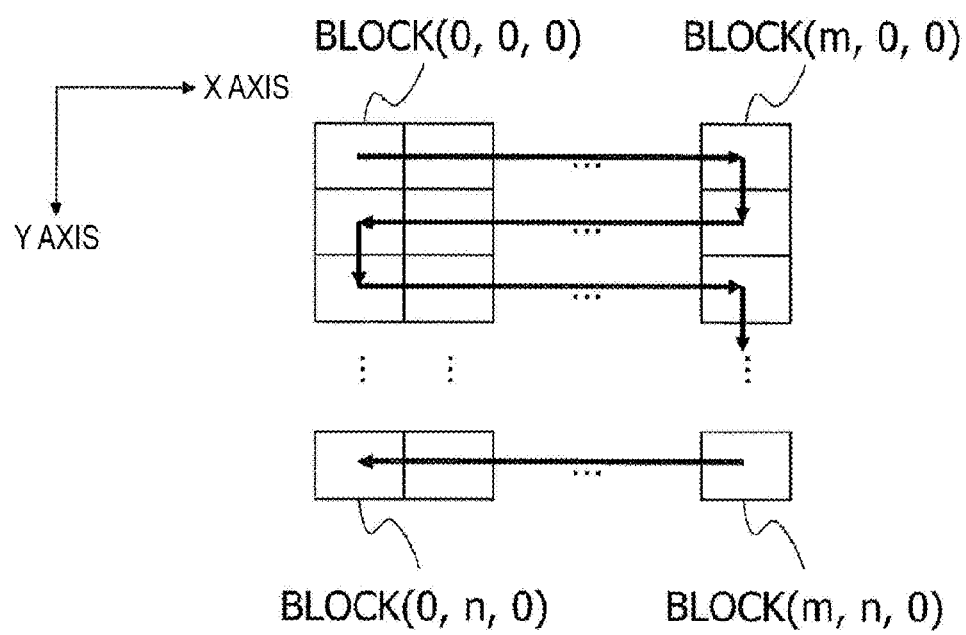

FIGS. 16A and 16B illustrate the appearance of the zigzag scanning represented in FIG. 15. In order to illustrate a three-dimensional scanning method, the appearance of the scanning in the directions Z and X is illustrated in FIG. 16A, and the appearance of the scanning in the directions X and Y is illustrated in FIG. 16B.

In FIG. 16A, the origin of the coordinates is positioned on the upper left side, the X axis extends toward the right side, and the Z axis extends toward the lower side. As illustrated in the figure, capturing is started from the data block BLOCK(0, 0, p) disposed on the lower left side, and a data block located on the upper side by one layer is captured in a direction opposite to the direction Z. When up to the uppermost data block BLOCK(0, 0, 0) is captured, the focus is moved to the right side (direction X) by one block, and data blocks located on a lower side by one layer are captured in the lower direction (direction Z). As described above, while the scanning direction is switched between the direction Z and the direction opposite to the direction Z, the process is repeated until the scanning of the column disposed on the corner in the direction X is completed. In the figure, in the column disposed at the right end, scanning is performed in the direction Z that is from the upper side to the lower side, whether the final column is completed by performing scanning from the upper side to the lower side or performing scanning from the lower side to the upper side depends on whether the number of columns is even or odd.

In FIG. 16B, the appearance of the scanning in directions X and Y seen from the upper side of the medium is illustrated. On the upper left side in the figure, the origin is taken, the X axis is drawn horizontally, and the Y axis is drawn vertically. As illustrated in FIG. 16A, in the scanning in the directions X and Z, when the scanning arrives at the corner in the direction Z, the focus is moved by one block in the direction X, and accordingly, in this figure, the first row is moved to the right side. When the scanning arrives at the rightmost side, the focus is moved by one block in the direction Y, and the scanning is performed in a direction opposite to the direction X. At positions X and Y, as illustrated in FIG. 16A, the scanning is performed in the direction Z. In this figure, while the final row is scanned from the right side to the left side, it is apparent that the direction in which the final row is scanned depends on whether the number of rows is even or odd.

As above, also in the scanning performed in the directions X and Y, the scanning is performed in a zigzag pattern. As above, in the example illustrated in FIGS. 16A and 16B, the appearance of the zigzag scanning according to the example illustrated in the flowchart represented in FIG. 15 has been described with reference to the figure. By performing the three-dimensional scanning as described above, the movement of the medium at the time when the scanning arrives at the corner of the layer or the corner in the directions X and Y can be minimized. For example, in a case where the scanning direction is fixed in the direction Z or X or in the direction opposite to the direction Z or X, when the scanning arrives at the corner, the scanning is performed to be moved from the corner of one layer to the corner of another layer or to be moved from the corner of one row to the corner of another row, and accordingly, the amount of movement at the time when the scanning arrives at the corner is large, and thus, a time required for reproducing data increases. In contrast to this, in this example, the required time can be markedly shortened. In the above-described example, the scanning is started from the data block BLOCK(0, 0, p), the scanning may be started from a data block different therefrom. In addition, in a case where required data is a part of recorded data, it is apparent that only the required portion may be scanned.

In addition, in the above-described scanning, in a case where the direction of mechanical scanning and the direction of the arrangement of the data blocks in the medium are inclined with respect to each other, out-of-focus may occur in a part of the field of view, or an image of a desired data block may be missing from the field of view during scanning. This can be solved by only installing the medium in a holder having high precision when the direction of the surface of the medium and the direction of the data block at the time of recording data are parallel to each other with sufficient precision. Thus, in a case where the precision is insufficient, it may be configured such that an adjustment mechanism is arranged in the holder, and the adjustment is finely performed while the check pattern included in the image of the data block is viewed using the monitor. Alternatively, various countermeasures such as the arrangement of a function for performing automatic adjustment based on the image of the check pattern and the like may be arranged. Since these are problems that can be handled by an engineer having knowledge, description thereof will not be presented.

Example 17

Figure 17:
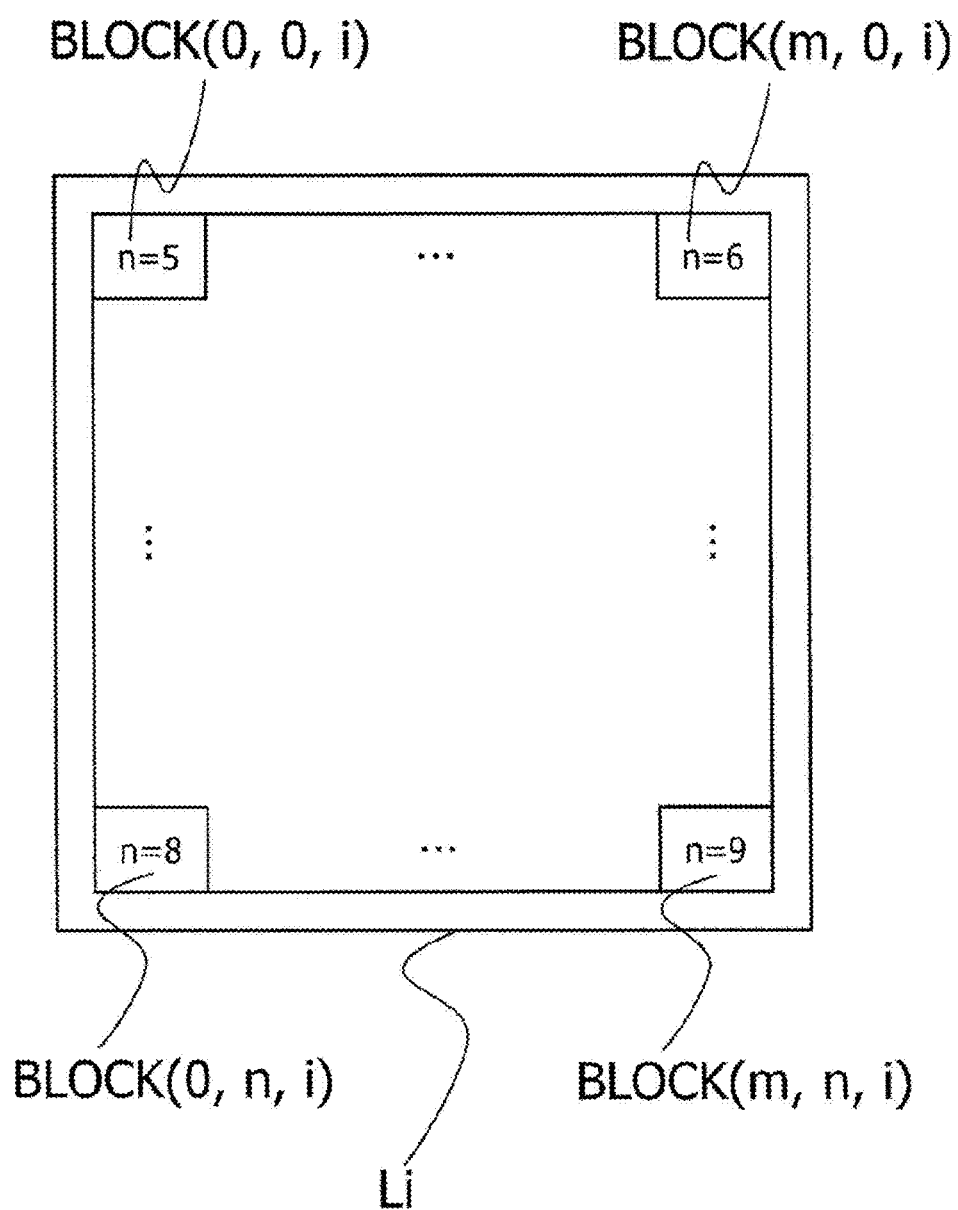
FIG. 17 is an example that illustrates that the number of frames used for reproduction is different in accordance with a data block.

As described with reference to FIG. 15, since a usable image is selected from among captured images based on the check pattern, there are cases where the number of usable frames is different depending on the data block. The appearance is illustrated in FIG. 17. In this figure, the number of used frames is represented inside each data block represented as a rectangle. In this figure, for easy understanding, while mutually-different numbers are written as is appropriate, in order to maintain a constant reproduction quality, it is preferable that variations in the numbers be small. Accordingly, when a motion picture is recorded while the focal position is changed within a predetermined distance in step STEP 6 of the example of the flowchart represented in FIGS. 16A and 16B, it is preferable that the movement speed is not too fast with respect to the frame rate of the motion picture. When the movement speed is too fast, the number of frames from which the check patterns are resolved decreases, and, in extreme cases, a situation may be formed in which even one frame cannot be used. Depending on the conditions, for example, in a case where the frame rate of the motion picture is 30 frames per second, when the motion picture is recorded, the movement speed is preferably about several microns per second. In addition, in a simple movement process in which a motion picture is not recorded, by increasing the movement speed, a reduction in the scanning speed can be suppressed.

Figure 18:
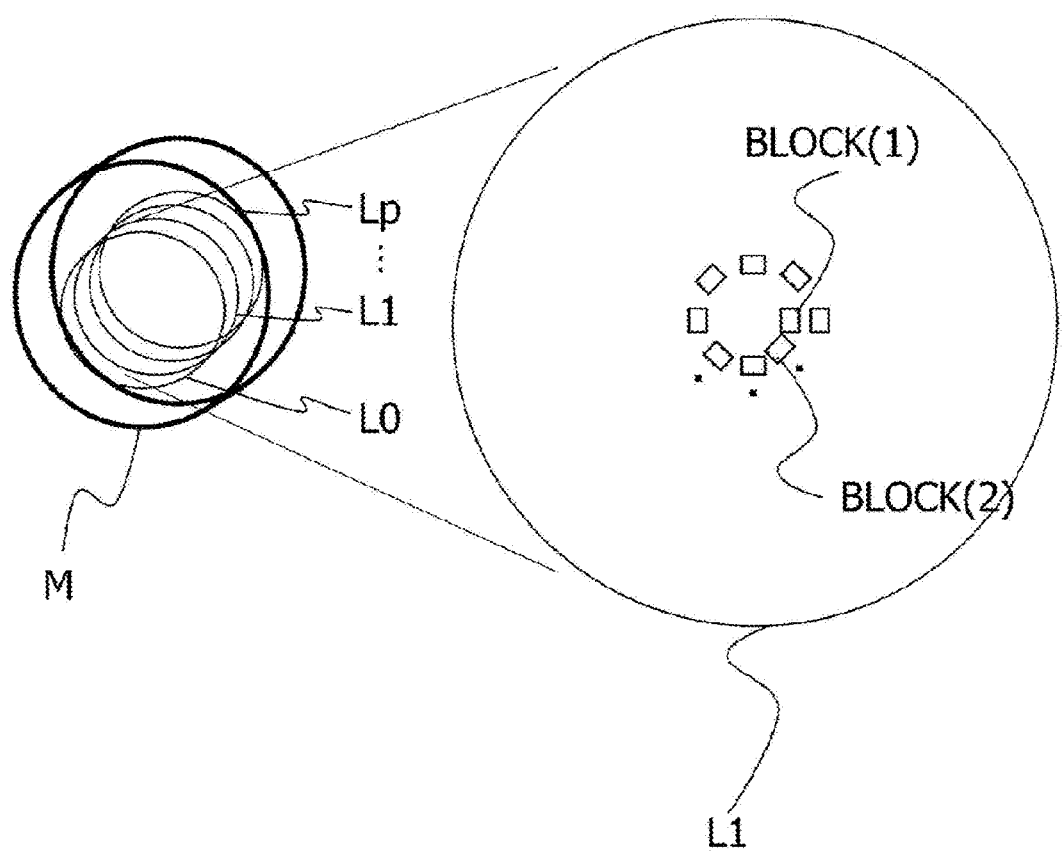
FIG. 18 is a first example of a transparent recording medium in which data blocks are arranged in a spiral shape.
Figure 19:
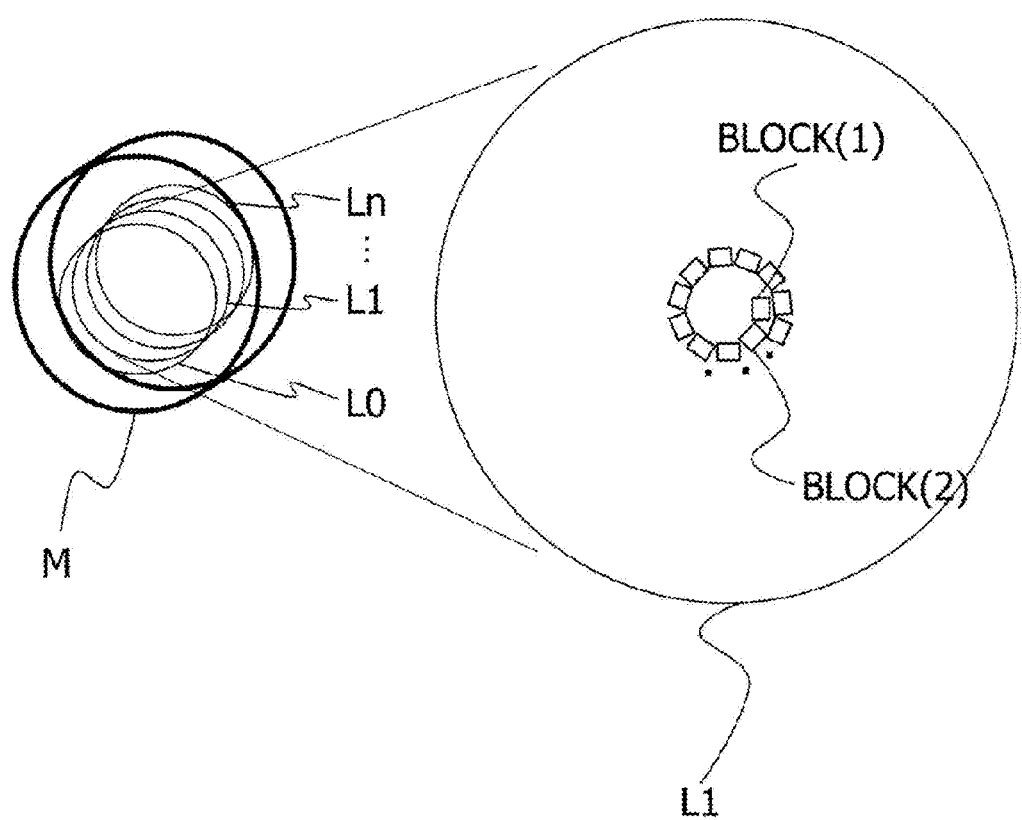
FIG. 19 is a second example of a transparent recording medium in which data blocks are arranged in a spiral shape.

In the examples described until now, while the data blocks stacked in the direction Z in a multiple-layer form are linearly aligned in the directions X and Y, the present invention is not limited thereto. Depending on the use thereof, the layer formed in the Z direction may be a single layer, and various variations in the arrangement in the directions X and Y may be further made. For example, the data blocks may be arranged in a spiral shape in the XY plane. Such examples are illustrated in FIGS. 18 and 19. In such examples, the scanning in the directions X and Y is not necessary at the time of performing reproduction, and only a rotational movement and a movement in the diameter direction are made, whereby there is an advantage that the control process can be easily performed. In any of the examples, the shape of the medium is a disk shape. Here, the shape of the medium may be a rectangle or a rectangular plate. However, since the arrangement of the blocks is in the spiral shape, in order to decrease an unnecessary area that cannot be used for recording data, the disk shape is advantageous.

Example 18

In the example represented in FIG. 18, the arrangement of data blocks is in the spiral shape, and the data blocks are radially arranged from the center. Accordingly, at the time of performing reproduction, while the medium is rotated by a predetermined angle each time, the field of view of the camera is shifted from the center to the outer side. While there is an advantage of having a constant scanning angle, as can be understood from the figure, toward the outer side, a distance between data blocks increases, and accordingly, the efficiency of the area that can be used for recording data decreases. Accordingly, in a case where the recording density is desired to be increase as much as possible, by employing the arrangement as illustrated in FIG. 19, the use efficiency of the area can be increased.

Example 19

FIG. 19 is an example in which data blocks are arranged such that a distance between the data blocks is constant at the time of arranging the data blocks in a spiral shape. In this example, not the rotation angle but the rotation speed is configured to be constant, and the field of view is moved in the diameter direction while being rotated. In such a case, the next block is viewed at the same time interval. In this example, there is an advantage that the use efficiency of the recording area is higher than that of the above-described example. In the examples illustrated in FIGS. 18 and 19, in a case where multiple layers are formed in the direction Z, when the rotary scanning of one layer is completed, the focus is moved to the next layer, and the scanning may be performed in a spiral shape. In such a case, when the spiral scanning of one layer is completed, the scanning may be performed by moving the focus to the next layer and, again, returning the focus to the center. Alternatively, in a case where the time required for returning the focus to the center influences the reproduction speed, it may be configured such that, when one layer is scanned from the center toward the outer side, the next layer is scanned from the outer side toward the center, whereby the required time can be shortened. In such examples, at the time of recording data, similar to the reproduction process, data can be recorded into the data blocks in accordance with a rotational movement and a movement in the diameter direction, and accordingly, there is an advantage that the control process can be performed more easily than a case where the scanning is performed in the directions X and Y.

FIGS. 20A, 20B, and 21A to 21C illustrate examples of reproduction systems suitable for the examples represented in FIGS. 18 and 19.

Example 20

Figure 20A:
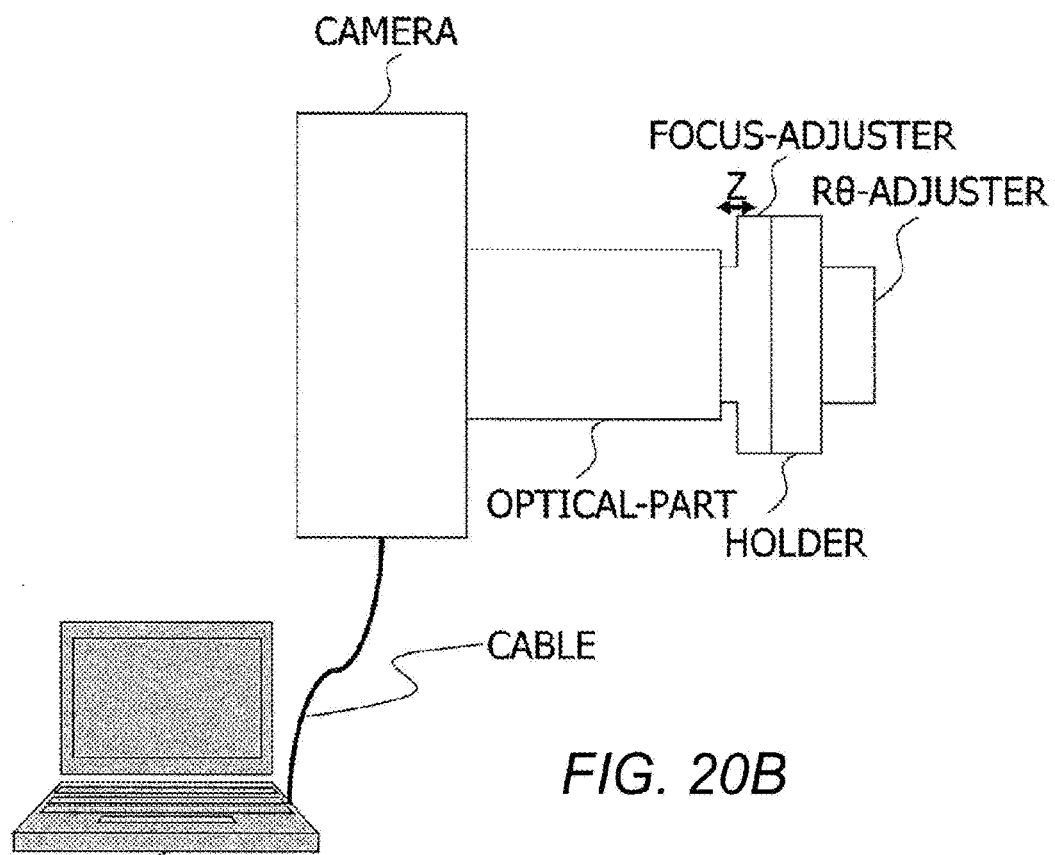
FIGS. 20A and 20B represent a first example that illustrates the configuration of a reproduction system provided with a rotation function.
Figure 20B:
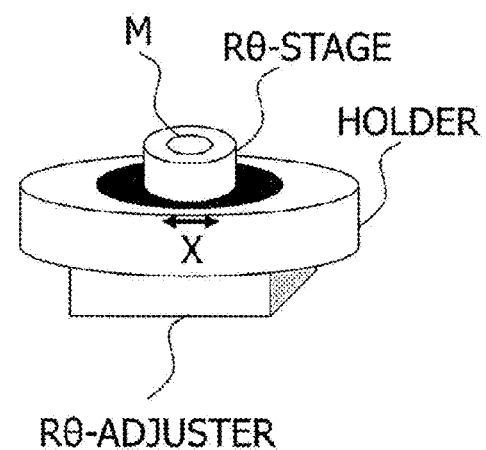

FIGS. 20A and 20B represent an example in which the example represented in FIGS. 11A and 11B is configured to be suitable for the spiral arrangement as illustrated in FIG. 19 or 20A and 20B, and FIGS. 21A and 21B represent an example in which the example represented in FIGS. 12A to 12C is configured to be suitable for the spiral arrangement as illustrated in FIG. 19 or 20A and 20B. In other words, the example represented in FIGS. 20A and 20B is a reproduction system that is based on a camera module to which a lens is not attached or the digital single lens reflex.

Example 21

Figure 21A:
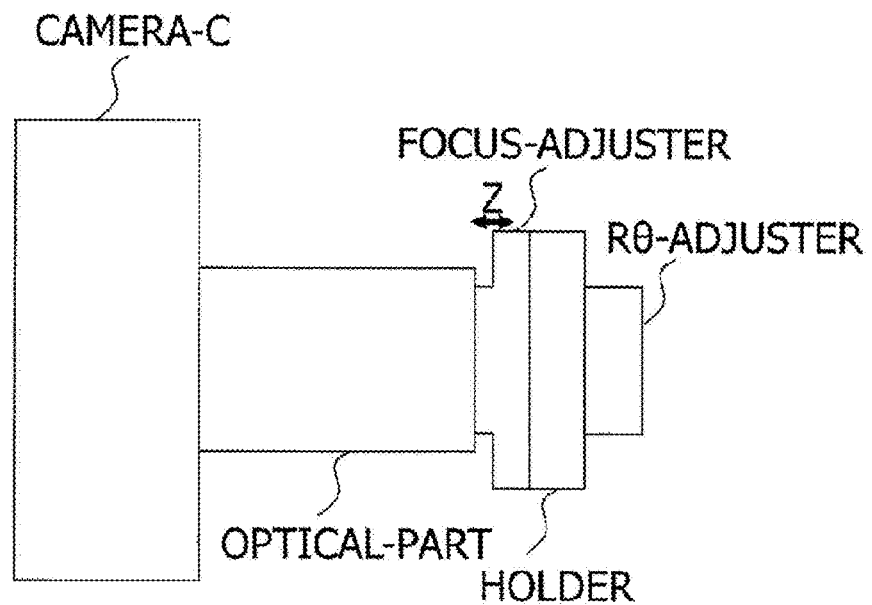
FIGS. 21A to 21C represent a second example that illustrates the configuration of a reproduction system provided with a rotation function.
Figure 21B:
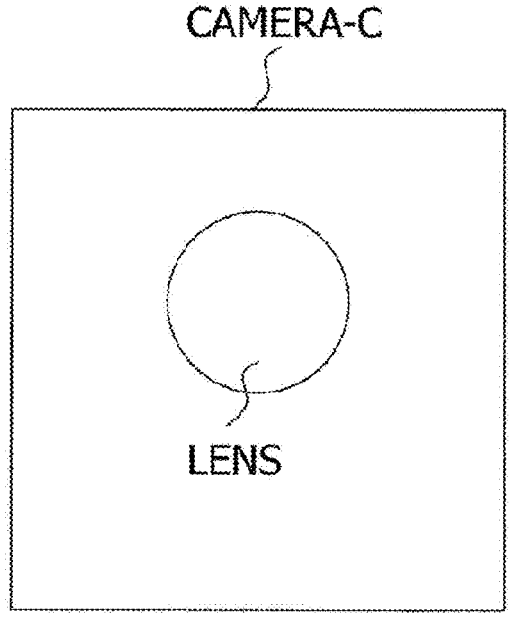
Figure 21C:
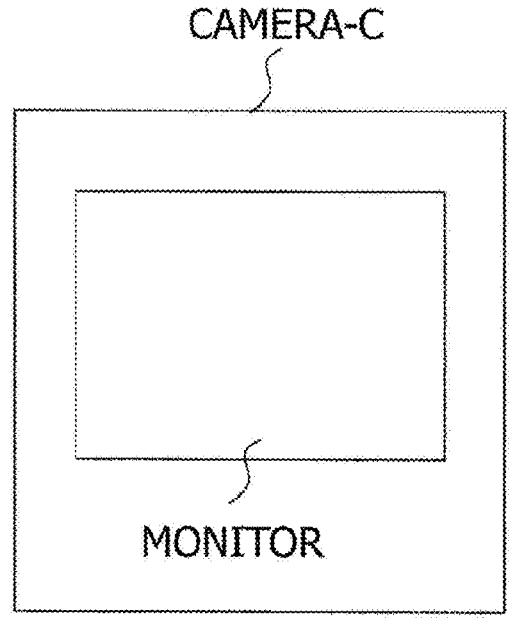

FIGS. 21A and 21B represents the example of the reproduction system that is based on a camera to which a lens is originally attached such as a smartphone or a compact camera.

A difference from the configuration illustrated in FIGS. 11A and 11B and 12A to 12C is that, instead of the movement in the directions X and Y, a movement mechanism for the radial direction (direction R) and a rotation mechanism are added. In FIGS. 20A and 20B and 21A to 21C, stages and adjustment mechanisms used for movement in the diameter direction, in other words, the direction R and movement in the rotation direction, in other words, the direction θ are denoted by Rθ-STAGE and Rθ-ADJUSTER. The control mechanism can be easily designed by an engineer having general knowledge, and, thus, detailed description thereof will not be presented. As an optical system applied to such examples, those illustrated in FIGS. 13 and 14 may be used.

As described above, by configuring the arrangement of the data blocks in the spiral shape, the medium can be driven in a simple manner. However, by configuring the medium in a tape shape, the mechanical control process may be further simplified.

Example 22

Figure 22:
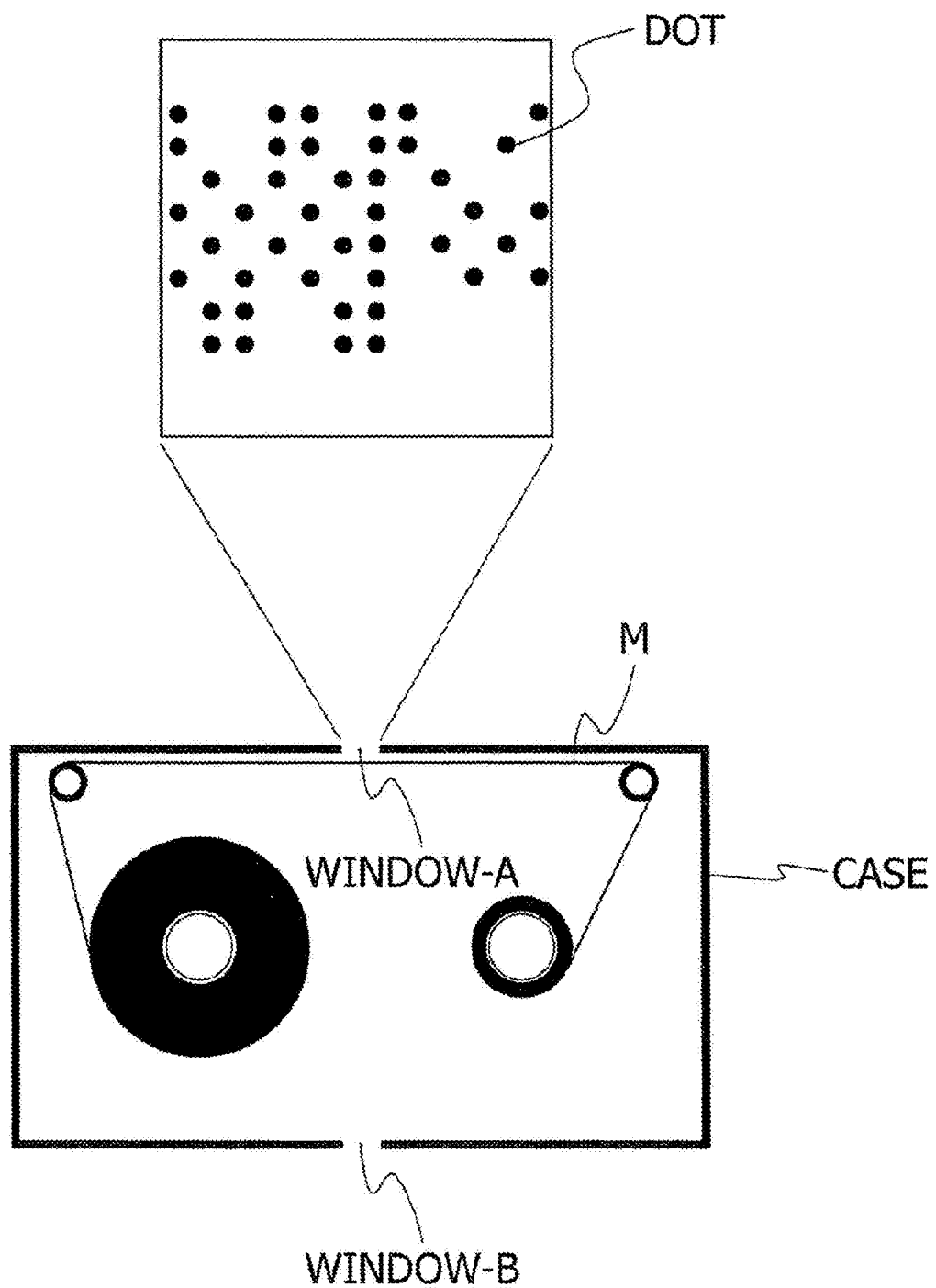
FIG. 22 is an example of a medium that has a tape form.

FIG. 22 represents an example in which the medium is configured in the tape shape. In the example, a transparent medium such as glass is formed in a thin tape shape and is housed in a case with being wound. On the upper side of the figure, an enlarged diagram of the tape is illustrated. Similar to the examples described until now, data blocks in which data is recorded as dots are aligned. On the lower side of the figure, the case CASE housing the medium is illustrated. In the figure, although the case is illustrated to have the inside thereof to be viewable, actually, depending on the situation, it is preferable to protect the tape from the outside by employing a structure in which the tape portion is not visible. As illustrated in the figure, in the rectangular case, circular column parts used for winding the tape are disposed on the left and right sides, and the tape stretches over the circular column parts. In the case, a capturing hole WINDOW-A and a lighting hole WINDOW-B are open. According to this example, since the medium can be housed by being wound, there is an advantage that the housing place can be configured to be smaller than that of the plate-shaped medium by using a long tape. In addition, in this example, by emitting a laser beam through the capturing hole with the tape being inserted into the case, recording can be also performed. By using the case of which the material has heat resistance and chemical stability, similar to the medium, the case can be preserved for a long period. For example, tape-shape glass may be used as the medium, and metal or alloy that is strong and does not deteriorate may be used as the material of the case. In such a case, when the thermal expansion coefficient of the circular column parts winding the tape is markedly different from that of the medium, there is a possibility that an excessive force is applied to the medium by being heated or cooled. Accordingly, a material having a thermal expansion coefficient that is close to that of the medium may be used, or the material of the circular column part used for winding the tape may be the same as that of the recording medium. For example, by using fused silica as the material of the medium and the circular column part used for winding the tape and using metal such as titanium having heat resistance and durability as the material of the case other than the circular column part, the conservation thereof for a long period can be made. In both cases of the multiple layer configurations and the single layer configuration, dots are recorded not on the surface of the tape but on the inside, the durability for long-term conservation is improved. However, in this example, there is a restriction on the thickness of the tape, there are cases where it is difficult to perform multi-layer recording. In such a case, by configuring the total number of layers to be one and forming the tape to be long, the recording capacity can be secured.

Example 23

Figure 23:
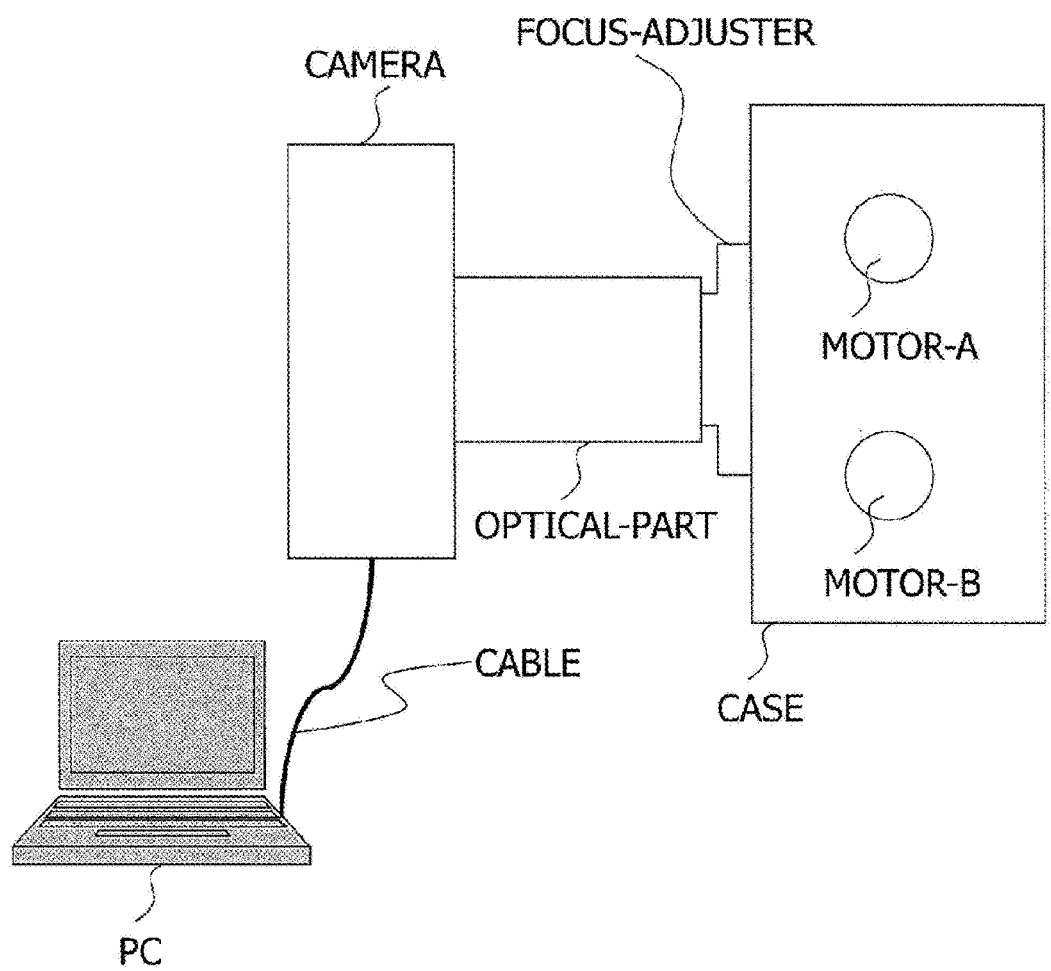
FIG. 23 is an example that illustrates the configuration of a reproduction system that is suitable for a medium having a tape form.

FIG. 23 is an example that illustrates the configuration of a reproduction system that is suitable for the example illustrated in FIG. 22. In a holder that is disposed in front of a camera and an optical system, motors MOTOR-A and MOTOR-B used for rotating the tape in the forward and reverse directions are installed. According to this example, images of data blocks are acquired through motion picture reproduction while the tape is wound, and recorded data can be reproduced. At that time, by using the check patterns arranged in the data blocks, capturing is performed while the focus is corrected, images of the data blocks having sufficient resolution are selected, the selected images are composed, and data can be sampled therefrom. In addition, in a case where data is recorded in multiple layers, when the scanning is performed in the direction Z while the tape is slightly wound each time, it takes a long time. Thus, the capturing of a motion picture and the reproduction of data are performed while the tape is wound up to the corner or a necessary position, the focus is moved in the direction Z, and data of the next layer is reproduced, whereby a decrease in the speed can be reduced.

Example 24

Figure 24A:
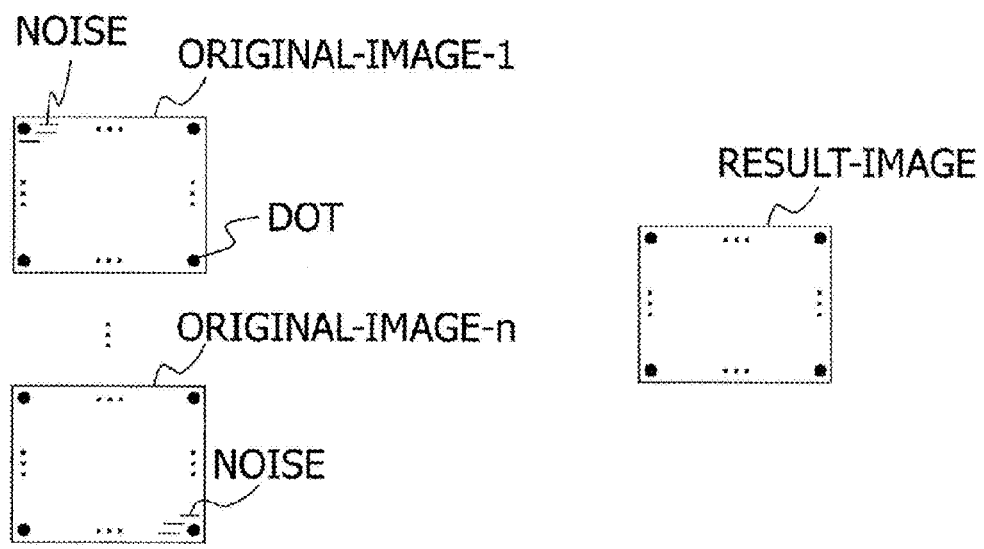
FIGS. 24A and 24B represent an example that illustrates a method of composing a plurality of frames.
Figure 24B:
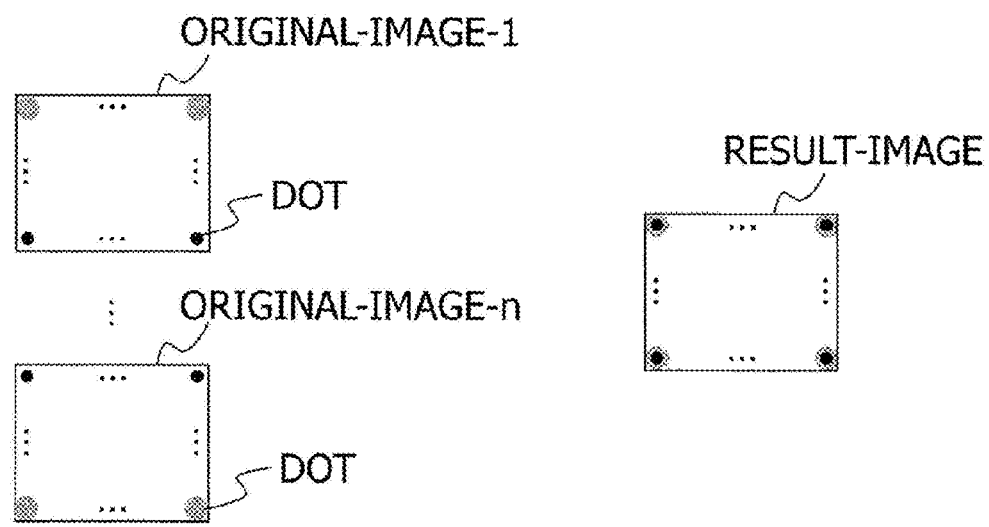

FIGS. 24A and 24B represent an example that illustrates the appearance of composition of a plurality of images in step STEP 8 represented in FIG. 15. FIG. 24A represents a case where composition is performed using an average, and FIG. 24B represents a case where composition is performed using a minimum value filter. In FIGS. 24A and 24B, ORIGINAL-IMAGE-1 to ORIGINAL-IMAGE-n represent a selected image group, and a description will be presented assuming that the deviation and the rotation in the XY plane have been corrected using check patterns. RESULT-IMAGE represents an image after the composition. In order to simplify the figure, only a small number of dots are drawn.

In FIG. 24A, an average of n images (frames) is calculated, and the images are composed as one image. According to this composition method, even when there is a random noise as illustrated in the figure in each frame, the random noise disappears after the composition through the averaging process. As above, when the composition is performed using the average, the influence of the random noise can be reduced.

FIG. 24B is an example in which composition is performed using a minimum value of pixels located at the same XY position. As described above, while there is also a case where a minimum value is taken in the directions X and Y after the composition, in this example, a plurality of images are composed using each minimum value in the direction Z, which is different from the description presented above. This example represents a method of selecting a darkest (low brightness) pixel from among pixels, which are located at the same XY position, of a plurality of images and composing the selected pixels. As illustrated in the figure, in the example represented in FIG. 24B, a dot is shown up sharply or shown up to be slightly blurred in accordance with a frame. Such a situation may occur in a case where the medium is tilted with respect to the optical axis or a case where dots of the same layer are recorded to be tilted with respect to the surface of the medium at the time of recording data. By using the minimum value, like a resultant image, a portion that is shown up to be darkest and sharp is conserved, and accordingly, there is an advantage that the density of dots shown up sharply on the whole composed image can be reflected even in a case where there is a tilt as described above. In addition, in a case where images captured under the condition for which dots are shown up brightly as described above are used, it is apparent that a maximum value may be used. Furthermore, it is apparent that various methods may be used depending on the situation such as a case where a median value at the time of aligning the values of pixels located at the same XY position in the descending order of the brightness level is used in addition to the case where the average or the minimum value (or the maximum value) is used as illustrated in this figure.

As above, while the present invention contrived by the inventors has been specifically described based on the embodiments, the present invention is not limited thereto. Thus it is apparent that various changes or schemes may be made therein in a range not departing from the concept thereof.

According to the optical recording medium and the optical information reproducing method according to the present invention, the recording data is sealed inside the transparent recording medium M, and accordingly, the information can be strongly conserved for a long period. In addition, the present invention enables a general user to easily reproduce bit information formed by minute structural changed areas included in the transparent recording medium in an ordinary residential space.

As above, the present invention enables a general user to reproduce information from a transparent medium on which data such as important personal photographs, texts, or speech data or data of a public document, a picture, or the like is recorded in a personal residential space or a counter of a public office, a library, an art museum, or the like.

What is claimed is:

1. An information recording medium, in which recording dots of minute structural changed areas having a refractive index different from the periphery are formed inside in the shape of a layer, that is transparent for reproduction light,
   wherein a data area used for recording information and a resolution check pattern area used for checking the resolution of an image are included in the layer, and
   wherein the resolution check pattern is configured by a set of dots,
   and there are two or more spatial frequencies within the arrangement of the dots, each spatial frequency defining a spacing between adjacent dots in the set of dots.

2. The information recording medium according to claim 1, wherein the two or more kinds of the-spatial frequencies are a highest spatial frequency and a second highest spatial frequency.

3. The information recording medium according to claim 2, wherein the two or more kinds of the-spatial frequencies further include a spatial frequency that is lower than the second highest spatial frequency.

4. The information recording medium according to claim 1,
   wherein the layer includes one or more data blocks, and wherein the resolution check pattern area is disposed in a center portion of the data block.

5. The information recording medium according to claim 1, wherein the layer includes one or more data blocks, and
wherein the resolution check pattern area is disposed on a corner of the data block.

6. The information recording medium according to claim 1,
wherein the layer includes a plurality of data blocks,
wherein the resolution check pattern area is disposed on corners of the data blocks, and
wherein the resolution check pattern is used to be common to the plurality of the data blocks.

7. The information recording medium according to claim 1,
wherein a parity area used for error correction of data of the data area is disposed in an outer peripheral portion of the data area.

8. An information reproduction apparatus that reproduces data recorded on a recording medium in which recording dots of minute structural changed areas having a refractive index different from the periphery are formed inside in the shape of a layer, the information reproduction apparatus comprising:
   a capturing unit that captures a motion picture while changing a focal position in a predetermined reproduction layer;
   a unit that reproduces a plurality of still images from the motion picture and determines whether the still images are usable for reproduction of data based on resolutions of resolution check patterns each configured by dots disposed in the recording medium;
   a unit that composes a plurality of the still images determined to be usable;
   a first buffer memory that stores an image captured from the motion picture; and
   a second buffer memory that is used for performing reproduction signal processing of the still images.

9. The information reproduction apparatus according to claim 8,
wherein the information reproduction apparatus is a camera-type reproduction apparatus in which a lens is installed.

10. The information reproduction apparatus according to claim 8, further comprising an infinity correction type optics,
wherein a mask used for changing transmissivity of light between a center portion in an optical axis and a peripheral portion is disposed between an objective lens and an imaging lens.

11. The information reproduction apparatus according to claim 8, further comprising a telecentric optical system.

12. An information reproducing method for reproducing data recorded on a recording medium in which recording dots of minute structural changed areas having a refractive index different from the periphery are formed inside in the shape of a layer, the information reproducing method comprising:
   capturing a motion picture while changing a focal position in a predetermined reproduction layer;
   reproducing a plurality of still images of a same region from the motion picture;
   extracting still images that are usable for reproduction of data based on resolutions of resolution check patterns each configured by dots disposed in the recording medium from the plurality of still images;
   composing a plurality of the extracted still images; and
   outputting the composed image,
   wherein, in the composing of a plurality of the extracted still images, a darkest pixel located at a same XY position in the plurality of the still images is selected, and the selected pixels are composed.

13. The information recording medium according to claim 1,
wherein the layer includes one or more data blocks, and
wherein the data blocks include two or more resolution check pattern areas, and arrangements of the dots are different from each other in each of the resolution check pattern areas.

14. The information recording medium according to claim 1,
wherein the information recording medium has a plurality of layers, each layer including one or more data blocks,
at least one of the data blocks is used as a parity area for error correction of data of the data area of other layers in an optical axis, and
a Z-parity flag is arranged to indicate the parity area.

15. The information recording medium according to claim 1,
wherein the layer includes one or more data blocks, and
the information recording medium further comprises:
   an attribute display area ID of the data block; and
   a pattern of the ID is described by a point drawing using dots, a line drawing, or a digital drawing.

16. The information recording medium according to claim 1,
wherein a main material of the medium is glass, plastic, alumina, or ceramic, and
wherein a shape of the medium is a disk shape, a rectangle or rectangular plate, or a tape shape.

17. The information reproduction apparatus according to claim 8,
further comprising a holder that installs the recording medium to the capturing unit.

18. An information reproducing method for reproducing data recorded on a recording medium in which recording dots of minute structural changed areas having a refractive index different from the periphery are formed inside in the shape of a layer, the information reproducing method comprising:
   capturing a motion picture while changing a focal position in a predetermined reproduction layer;
   reproducing a plurality of still images of a same region from the motion picture;
   extracting still images that are usable for reproduction of data based on resolutions of resolution check patterns each configured by dots disposed in the recording medium from the plurality of still images;
   composing a plurality of the extracted still images; and
   outputting the composed image,
   wherein, the step of composing of a plurality of the extracted still images is performed using an average of pixels, a minimum value, a maximum value, or a median value, after correcting a deviation and a rotation in the layer plane.

* * * * *